US008458587B1

(12) United States Patent  
Theophil et al.

(10) Patent No.: US 8,458,587 B1
(45) Date of Patent: Jun. 4, 2013

(54) METHOD OF ENTERING PAGE LAYOUT CONSTRAINTS INTO A COMPUTER

(75) Inventors: Sebastian Theophil, Berlin (DE); Valentin Ziegler, Berlin (DE); Arno Schodl, Berlin (DE); Markus Hannebauer, Berlin (DE)

(73) Assignee: Think-Cell Software GmbH, Berlin (DE)

( * ) Notice: Subject to any disclaimer, the term of this patent is extended or adjusted under 35 U.S.C. 154(b) by 0 days.

(21) Appl. No.: 13/359,986

(22) Filed: Jan. 27, 2012

(51) Int. Cl.
*G06F 17/00* (2006.01)
*G09G 5/00* (2006.01)

(52) U.S. Cl.
USPC ........... 715/246; 715/226; 715/243; 715/760; 715/858; 345/651; 345/662

(58) Field of Classification Search
USPC ................. 715/200, 201, 204, 205, 209, 226, 715/231, 240, 243, 244, 246, 251, 252, 255, 715/273, 700, 731, 741, 760, 849, 858, 861; 345/418, 427, 428, 619, 621, 650, 651, 661, 345/662, 676, 677, 681
See application file for complete search history.

(56) References Cited

U.S. PATENT DOCUMENTS

| 7,478,328 | B2 * | 1/2009 | Hannebauer et al. | 715/731 |
| 7,516,402 | B2 * | 4/2009 | Koivisto et al. | 715/238 |
| 2005/0237321 | A1 * | 10/2005 | Young et al. | 345/418 |
| 2010/0020101 | A1 * | 1/2010 | Schormann | 345/654 |
| 2010/0229140 | A1 * | 9/2010 | Strolenberg et al. | 716/9 |
| 2012/0054603 | A1 * | 3/2012 | Demant et al. | 715/247 |
| 2012/0278696 | A1 * | 11/2012 | Carper et al. | 715/234 |

* cited by examiner

*Primary Examiner* — Maikhanh Nguyen
(74) *Attorney, Agent, or Firm* — Martin Fleit; Paul D. Bianco; Fleit Gibbons Gutman Bongini & Bianco PL

(57) ABSTRACT

A method of entering page layout constraints into a computer. The method comprises providing a container for representing a page layout. The method further comprises providing a set of graphical objects, each having a set of object gridlines for delimiting important graphical features. Each of the set of object gridlines has a span. The method further comprises selecting and placing the set of graphical objects one by one within the container. Each of the selected graphical objects are positioned by snapping the position of the span to a non-empty gridline or by adding a new gridline. The method further comprises determining at least one pair of colliding gridlines. Colliding gridlines have a parallel direction and at least one pair of spans which at least partially overlap in the parallel direction. The method further comprises inserting page layout constraints between the at least one pair of colliding gridlines.

20 Claims, 24 Drawing Sheets

METHOD OF ENTERING PAGE LAYOUT CONSTRAINTS INTO A COMPUTER

FIELD OF THE INVENTION

The invention relates to page layout, in particular to the entry of page layout constraints into a computer.

BACKGROUND AND RELATED ART

The efficiency of desktop publishing is severely limited by the lack of sophisticated automatic document layout systems. State-of-the-art algorithms either require the input to be written in a description language such as HTML and LATEX, or to be a manually designed layout template.

However, description languages are ill-suited to express layout problems with weak semantics and layout templates shift the burden from the end user to the template designer.

SUMMARY

Embodiments of the invention may provide for a method of entering page layout constraints using graphical objects or geometric shapes. The graphical objects are selected one by one and placed onto a container. The container may for instance be a palette on a graphical user interface. By the way the graphical objects are placed into the container various constraints between the graphical objects can be deduced. Graphical objects have spans and gridlines which are used to delimit important graphical objects.

In one interpretation, gridlines are horizontal or vertical lines. Spans are line segments or points of the gridlines which intersect or are tangent to the geometric shape. The collisions between different gridlines are detected by determining possible collisions between spans. Constraints are then inserted between gridlines with collisions.

Graphical objects also include lines. For example, the lines may be lines or shapes drawn on the page by a user. Lines may also be lines which connect graphical objects together. The sections of a line can also be defined using gridlines and spans.

Embodiments of the invention may allow the solution of many different types of layout problems, including but not limited to: table layout problems, yellow page layout problems, presentation slide layout problems, and many different types of user interface layout problems.

User-generated input problems are frequently over- or under-constrained. If the layout problem is over-constrained, the quality of the solution layout degrades gracefully. In some embodiments a layout algorithm finds a solution layout with the most equitable distribution of constraint errors among the layout constraints, i.e., the solution closest to the user's original intent.

In some embodiments a page layout algorithm detects the under constrained sub problems that adversely affect the solution layout. It adds the minimal number of constraints required to achieve the fully specified layout problem that is closest to the user's input.

Embodiments of the invention may also provide for a direct manipulation user interface, e.g. a graphical user interface, that lets users create a class of general constrained layout problems. It may hide the complexity of the constraint system and avoids the usability problems that have plagued constraint drawing applications. It may have the advantage that it eliminates the need of document description languages and manually-created layout templates.

Embodiments of the invention may also provide for a method of solving page layout constraints. After a set of page layout constraints are entered or received, it may be possible that the set of constraints over-constrain the page layout. In other words, it may be possible to place too many constraints on the layout of the page that it is impossible to solve for a solution. Embodiments may solve this problem and others by using a resource algorithm to layout graphical objects on a page. If the space between graphical objects is treated as a resource, the resource algorithm can be used to equitably divide the space between the different constraints. If the constraint error is treated as a resource, i.e., the difference between the currently achieved value of a constraint equation and its target value, the resource algorithm can be used to equitably divide the constraint errors between the different constraints and thus find a layout solution for over-constrained layout problems.

This may be performed by first grouping the page layout constraints into groups of constraints of the same type. The constraints in each of these groups are then transformed into resource constraints. A resource constraint as used herein encompasses a constraint with an additional scale variable. A resource allocation algorithm is then used to solve each of the groups in the order of their priority. The use of the resource allocation algorithm to solve the resource constraints enables the solution of page layout problems when the page layout is over-constrained.

In one aspect the invention provides for a method of entering page-layout constraints into a computer. A page-layout constraint as used herein is a constraint which may be used to define the position or relative position of a graphical object on a page. A graphical object encompasses anything which may be displayed, shown or rendered on a page A page as used herein encompasses a region for displaying graphical content. For instance a page may encompass printed material on a piece of paper and may also encompass a display or region of a display.

The method comprises the step of providing a container for representing a page-layout. The container is delimited by an existing set of gridlines. A container as used herein encompasses a data structure for storing or representing a page-layout. A rendering of a container may include, but is not limited to: a printed page, a graphical display and a presentation page. A gridline as used herein encompasses a line or coordinate which may be used to delimit the position of a graphical object or a structural component of a graphical object. Gridlines may for instance be a representation of a line or may simply be a particular coordinate.

The method further comprises the step of providing a set of graphical objects. Each of the objects has a set of object gridlines for delimiting important graphical features of the object. Each of the set of object gridlines has a span which is identical with one of: where the object and the gridline overlap and where the object and the gridline intersect. The gridlines and spans may be interpreted in several different ways. For instance a gridline may represent a line which passes through the important graphical features of the object. The span is just that portion of the line which passes through the graphical object or which is tangent or intersects the graphical object. The spans may also be interpreted as line segments and the gridlines may be a coordinate which defines a line which passes through that line segment. Both interpretations are logically equivalent. For instance a square may be identified by four gridlines which have spans on the edges of the square. Alternatively a square may be identified as four short line segments which form the edges of the square. The gridlines would then be coordinates which indicate lines passing through the spans.

The method further comprises the step of selecting the set of graphical objects one by one. The method further comprises the step of placing each selected graphical object within the container. Each of the selected graphical objects is positioned by one of: snapping the position of the span to a non-empty gridline and positioning the span onto the container by adding a new gridline. For instance the particular graphical object may be dropped onto a representation of the container by a mouse. If a span is moved within the vicinity of a non-empty gridline it may be snapped to the non-empty gridline. However, if there are no non-empty gridlines to which a span can snap to when the selected graphical object is dropped onto the representation of the container a new set of gridlines may be added or inserted into the container. The method further comprises the step of determining at least one pair of colliding gridlines. Colliding gridlines have a parallel direction and at least one pair of spans which at least partially overlap in the parallel direction. The method further comprises the step of inserting page-layout constraints between the at least one pair of colliding gridlines.

There may be a variety of types of page-layout constraints which are inserted. For instance there may be a minimum constraint inserted between a linear combination of gridlines. This ensures that a linear combination of gridline values has a minimum value. If the linear combination is of the form a-b this constraint ensures a minimum distance between gridline values a and b. There may also be a maximum constraint. This type of constraint specifies that the value of a linear combination of gridline values must be less than a constant. A fixed distance constraint may also be inserted. In this constraint a linear combination of gridline values is equal to some constant. A fixed distance constraint may be thought of being equivalent to a minimum distance and a maximum distance constraint. The page-layout constraint may also be an equal distance constraint, in this constraint multiple linear combinations of gridline values are constrained to be identical times some constant factor. The page-layout constraints may also include pair wise merge constraints. This constraint specifies that two gridlines are to be merged into a single destination gridline. There may also be other type of page-layout constraints inserted. For a particular graphical object there may be predefined relationships between the geometry of the various object gridlines. There may also be page-layout constraints depending upon the content of the graphical object. For instance a graphical object may contain video, text or other information. The video may be specified to be greater than a minimum size in order that the contents of the video are visible. If the graphical object contains text there may be constraints which are used to ensure that the text is readable and that its lines break in desired positions.

In another embodiment the method further comprises specifying a distance constraint between a pair of gridlines or between a pair of graphical objects. For example, a user can specify explicit size constraints of different kinds: A shape, multiple shapes and more generally, a pair of gridlines, can be constraint to have a specific distance. The distance can be specified by entering an exact distance in metric units of distance or any other distance unit. The distance can also be specified interactively by entering the size-constraint interaction mode, e.g. through pressing a modifier key, e.g. the Ctrl-key, and resizing the shape or the pair of gridlines to the desired size. This constraint is persistent and the solver will always try to maintain the constraint even through further changes to the page. In general, several shapes, or more generally several pairs of gridlines, can be constraint to have equal distance or any specific distance ratio.

Equal distance constraints and fixed distance constraints over overlapping sets of gridline pairs will be merged in this embodiment. An equal distance constraint over gridline pairs 1 and 2, another equal distance constraint over gridline pairs 2 and 3, and a fixed distance constraint over gridline pair 3 result in a single fixed distance constraint over gridline pairs 1, 2, and 3.

In another embodiment the method further comprises fixing the location of a gridline. In this embodiment, gridlines can be fixed to a particular location in the container by the user. When the set of constraints is solved the location of the gridline may remain fixed.

In another embodiment the method further comprises the step of calculating spans and inserting layout constraints for every collision. In some embodiments there may be a page-layout constraint inserted for every collision. However, in an alternative embodiment a page layout constraint is not inserted for every collision. For example, in some cases constraints may be removed without causing the set of constraints to become under constrained.

In another embodiment the method further comprises calculating the page-layout constraints depending on the content of the shape. For instance if the shape contains text information there may be alternative text sizes depending on the text flow, with the height ratios and fixed sizes which are specified for the text.

In another embodiment the spatial relations between shapes are maintained by a set of predetermined rules. For example, this may be performed by detecting colliding spans between gridlines of shapes and inserting a constraint for every collision. This may also be performed by letting the user specify object relations. For instance the user may specify that an object is above a particular gridline, is below a particular gridline, is to the left of a particular gridline, is to the right of a particular gridline, or is horizontally centered with respect to the page or another object with respect to the page, is vertically centered with, or by letting the user describe the function of the shapes. For instance a shape may be designated as a headline, footnote, main content, or annotation.

In another embodiment the method further comprises the step of applying a constant constraint resolution algorithm for automatically repositioning and resizing the graphical object using the page-layout constraints. The constraint resolution algorithm encompasses an algorithm which may be used to solve page-layout constraints. For instance after each of the selected graphical objects is placed within the container, the constraint resolution algorithm may solve the existing page-layout constraints and automatically reposition and resize the graphical objects within the container. This may have the advantage that it provides for an automatic way of arranging the graphical objects on a page layout as they are being placed or inserted into it.

In another embodiment the method further comprises displaying the container with the graphical object after positioning and resizing the graphical objects within the container. This may include rendering the container. In the case of paper it may include printing the paper.

In another embodiment at least one of the set of graphical objects comprises predefined constraints between the set of object gridlines. The predetermined constraints are added to the page layout constraints. For instance when a graphical object is placed into the container there may be a set of constraints between the object gridlines that are automatically added. This may be beneficial because certain types of graphical objects may be desirable to have predefined constraints to maintain the content of the graphical object or to maintain a particular shape. For instance the graphical object may be pentagonal-shaped. The predefined constraints may define the relationship between the graphical object gridlines such that the graphical object remains a pentagon.

In another embodiment the method further comprises repositioning a graphical object within the container by selecting a repositioned object from the set of graphical objects located within the container for repositioning. The repositioning of the graphical object further comprises filtering gridlines belonging only to the repositioned object located within the container. Filtering gridlines makes them unavailable for a snapping operation. For instance if an object is repositioned one may not want the object to snap to its own gridline. The repositioning of the graphical object further comprises placing the repositioned object within the container. The repositioned object is positioned by one of: snapping the position of the span to a non-empty gridline and positioning the span onto the container by adding a new gridline. The repositioning of the graphical object further comprises inserting page-layout constraints between the pairs of gridlines. In some embodiments this may include determining at least one pair of colliding gridlines. The colliding gridlines have a parallel direction and at least one pair of spans which at least partially overlap in the parallel direction. In this case the pairs of gridlines to which the page-layout constraints are inserted are the pairs of colliding gridlines.

There are different ways to reposition an object. The object may be completely repositioned, or single gridlines of the object may be moved by dragging on the corner or span of an object. Repositioning an object can also mean flipping or rotating the shape.

In another embodiment the method further comprises the step of displaying an image of the repositioned object on a display in its original position until the repositioned object is repositioned. The method further comprises the step of removing the image of the repositioned object after the selected graphical object is repositioned. This embodiment may be useful for a subject to determine how far the repositioned object is moved.

In another embodiment the method further comprises the step of highlighting the span when snapping the span to the non-empty gridline. For instance the method may be performed using a graphical user interface. As the graphical object is placed or dropped into the container the span which is going to snap to the non-empty gridline may be highlighted. The method further comprises the step of highlighting at least one other span. The at least one other span is aligned with the non-empty gridline. This embodiment may be beneficial because it helps to illustrate what the relationship is between different spans during the placement of the graphical object.

In another embodiment each span is classified as one of: a high span, an interior span, or a low span. The span is classified as a high span if the object is to a first direction with respect to the span. The span is classified as an interior span if the span is at least partially within the object. The span is classified as a low span if the object is to a second direction with respect to the span. For instance the first direction and the second direction may be opposite directions. The method further comprises the step of displaying a snapping span during a snapping operation. The snapping span is highlighted in the first direction if the span is the high span. The snapping span is highlighted in both the first direction and the second direction if the snapping span is an interior span. The snapping span is highlighted in the second direction if the span is a low span.

In another embodiment snapping the position of the span to a non-empty gridline is determined by a set of predetermined rules. The set of predetermined rules may be used to determine if a span snaps to a non-empty gridline or not. For instance the rules may include rules about the proximity to which a span comes to a non-empty gridline before it snaps. One rule might for instance be that the span needs to be within a predetermined distance of the non-empty gridline. Another rule may be that the span needs to be the closest to a particular non-empty gridline.

In another embodiment the method further comprises the step of detecting an overlap of two or more graphical objects. The method further comprises the step of moving the two or more graphical objects to remove the overlap by moving spans of the two or more graphical objects apart. In some embodiments this may be achieved by ordering the gridlines. For instance the gridlines for each graphical object may have a particular order. They may be moved apart such that the gridlines of each of the two or more graphical objects are not within the other graphical objects.

In another embodiment there is a first existing object and a second existing object and each is chosen from the set of graphical objects located in the container. That is to say the first existing object and the second existing object are chosen from the set of objects located in the container. There is at least one page-layout constraint between the first existing object and the second existing object. The method further comprises inserting an insertion graphical object between the first existing object and the second existing object by performing the step of placing the insertion graphical object between the first existing object and the second existing object. Inserting the graphical object further comprises the step of determining a set of non-overlapping positions. Each member of the set of non-overlapping positions defines a non-overlapping position for the first existing object, the second existing object, and the insertion graphical object. Inserting the insertion graphical object further comprises the step of selecting one of the set of non-overlapping positions. Inserting the insertion graphical object further comprises the step of repositioning gridlines of the first existing object, the second existing object, and the insertion graphical object in accordance with the selected one of the set of non-overlapping positions. Inserting the insertion graphical object further comprises the step of inserting page-layout constraints between the repositioned gridlines.

In another embodiment inserting the insertion graphical object further comprises finding for each existing overlapping object a number of new positions such that the existing object and the new position do not intersect the insertion object. For instance by calculating for each combination of horizontal and vertical orientation and low and high directions the spans of the gridlines of the existing object. A further example is collision testing the spans of the existing object with the spans of the insertion object. Another example may be moving the gridlines of the existing object such that the collisions between the existing objects and the insertion objects are resolved.

In another embodiment the one of the set of non-overlapping positions is selected by finding a maximum cardinality set of overlapping objects that can be moved to the new position without overlapping each other. In other words, the solution with the biggest set of moved objects is selected. For example if conflicting solutions are found, i.e., if you can do either A or B, but not both, you can try to decide if A or B is better. A may be better if it removes more overlapping shapes, i.e., it is the solution with the maximum cardinality.

In another embodiment the container contains a deletion object. The deletion object is a graphical object associated with container gridlines and comprises spans. The deletion object is located between a first existing object and a second existing object. The method further comprises deleting the deletion object by performing the step of determining if there are any existing page-layout constraints between the first existing object and the second existing object. The method further comprises the step of removing the deletion object and the page-layout constraints between the first existing object and the deletion object and any page-layout constraints between the second existing object and the deletion object. The method further comprises the step of colliding the first existing object and the second existing object if there are no remaining page-layout constraints between the first existing object and the second existing object. Colliding the first existing object and the second existing object causes at least one span from each of the first existing object and the second existing object to snap to the same gridline.

The deletion object can be an object that is explicitly deleted from the container, or any object that is removed from its current position, e.g., after being repositioned or cut and pasted.

In another embodiment there is a left existing object and a right existing object adjacent to the left one and each one is chosen from the set of graphical objects located in the container. The method further comprises inserting an insertion graphical object either between the left and the right existing object, overlapping the left or the right existing object, or overlapping both the left and the right existing object. The insertion graphical object is then aligned in either a vertical or horizontal direction with the left and right existing object by performing the step of moving the right-most spans of the left object to the left and snapping it to the left-most gridlines of the insertion object. The steps further perform moving the left-most spans of the right object to the right and snapping it to the right-most gridline of the insertion object. The steps further perform inserting page-layout constraints.

In another embodiment the container contains a deletion object. The deletion object is a graphical object associated with container gridlines and comprises spans. The method further comprises deleting the deletion object by performing the steps of determining all gridlines that can be merged if the deletion object was deleted. This may for instance be accomplished by collecting the page-layout constraints for all the graphical objects, removing the deletion object, and finding all pairs of gridlines that were separated by page-layout constraints after selecting the page-layout constraints for all the graphical objects that are no longer separated after removing the deletion object. The steps further perform merging the pairs of gridlines found by either merging all spans of the gridline immediately or by adding a merge constraint and leaving the merging to a page resolution algorithm. A page resolution algorithm may refer to a straight resolution algorithm. The steps further comprise calculating a new page-layout constraint. This may include merging constraints from the step of adding a merge constraint.

In another embodiment there is a left existing object, a middle existing object adjacent to the left object and a right existing object adjacent to the middle object and each one is chosen from the set of graphical objects located in the container. The method further comprises deleting the middle object and closing the resulting gap between the left object and the right object if both objects are not kept apart by page-layout constraints created through other objects.

In another embodiment the method further comprises the step of adding a content element to each of the set of graphical objects. The content element comprises any one of the following: a video clip, text, an image, a diagram, a figure, a three-dimensional model rendering and combinations thereof.

In another embodiment the method further comprises removing an existing page-layout constraint if a newly added page-layout constraint violates the existing page-layout constraint. This may be beneficial because it reduces the likelihood that the page-layout becomes over-constrained.

In another embodiment the page-layout constraints may be any one of the following: a minimum distance constraint, a maximum distance constraint, a fixed distance constraint, an equal distance constraint and a merge constraint.

In another embodiment the container contains an existing graphical object. The method further comprises copying and pasting the existing graphical object by performing the step of selecting the existing graphical object located within the container for repositioning. The method further comprises the step of creating a copy graphical object from the existing graphical object. The method further comprises placing the copy graphical object within the container. The copy graphical object is positioned by one of snapping the position of the span to a non-empty gridline and positioning the span onto the container by adding a new gridline. The method further comprises the step of inserting page-layout constraints between the pairs of gridlines, in some embodiments the steps may further comprise identifying the pairs of gridlines to which the constraints are added by determining if the gridlines collide or not.

In another embodiment the method further comprises the step of selecting a subset of existing page-layout constraints. The page-layout constraints are selected by any one of the following methods: selecting all of the existing page-layout constraints, selecting layout constraints of a pre-selected type, selecting page-layout constraints between gridlines belonging to one or more selected shapes, and combinations thereof. The method further comprises the step of displaying the subset of existing page-layout constraints graphically on a display when placing each of the set of graphical objects in the container. In some embodiments the constraint visualizations can be manipulated, deleted, and their distance value changed thereby generating different page layout constraints.

In another embodiment the method is applied to a multiple page document. The multiple page document comprises multiple pages each represented by one of a set of multiple containers. The multiple containers have the same position on all pages in the multiple page document thereby aligning the graphical object on each of the pages. The method further comprises the step of selecting a gridline from a first page of the multiple page document. The method further comprises the step of inserting a copy of the gridline into the second page of the multiple page document. The gridline and the copy of the gridline are logically linked to form a global gridline. The global gridline has the same position in both the first page and the second page. In some embodiments the global gridline will be on all pages and have the same position on all pages.

In another embodiment the gridline is selected from a span of a graphical object. For instance to create a multiple page document you may grab a span of a graphical object and drop it onto the other page.

In another embodiment the method further comprises the step of storing in a hierarchical data structure the gridlines within the container and the page-layout constraints between the gridlines. The method further comprises the step of applying a constraint resolution algorithm for automatic layout of the graphical objects to the stored hierarchical data structure and for automatically repositioning and re-sizing the graphical objects based on the constraints between the spans.

In another embodiment the snapping of the position of the span to the non-empty grid line is performed by applying sequentially a set of snapping rules to determine the snapping of the span to the non-empty gridline and by undoing the snapping of the span to the non-empty gridline if two or more of the set of snapping rules violate each other. There may be a list of snapping rules to determine the conditions under which a span is snapped to a grid line. In some embodiments the snapping rules are applied sequentially until there are no rules left to apply anymore. In some embodiments, If two or more rules are violated during this process then the snapping or changes in the layout made by applying the other rules are undone. Essentially, none of the rules are applied if there is any conflict between them.

In another aspect the invention provides for a non-transitory computer-readable storage medium storing machine-readable instructions. Execution of the instructions causes a processor to provide a container for representing a page-layout. The container is delimited by an existing set of gridlines. Execution of the instructions further causes the processor to provide a set of graphical objects. Each of the objects has a set of object gridlines for delimiting important graphical features of the object. Each of the set of object gridlines has a span which is identical with one of: where the object and the gridline overlap and where the object and the gridline intersect. Execution of the instructions further causes the processor to receive a selection of the set of graphical objects one by one. Execution of the instructions further causes the processor to receive the placement of each selected graphical object within the container. Each of the selected graphical objects are positioned by one of snapping the position of the span to a non-empty gridline and positioning the span onto the container by adding a new gridline. Execution of the instructions further causes the processor to determine at least one pair of colliding gridlines. Colliding gridlines have a parallel direction and at least one pair of spans which at least partially overlap in the parallel direction. Execution of the instructions further causes the processor to insert page-layout constraints between the at least one pair of colliding gridlines.

In another aspect the invention provides for a computer system comprising a processor and a non-transitory computer-readable storage medium storing machine-readable instructions. Execution of the instructions causes the processor to provide a container for representing a page-layout. The container is delimited by an existing set of gridlines. Execution of the instructions further causes the processor to provide a set of graphical objects. Each of the objects has a set of object gridlines for delimiting important graphical features of the object. Each of the set of object gridlines has a span which is identical with one of: where the object and the gridline overlap and where the object and the gridline intersect. Execution of the instructions further causes the processor to receive the selection of the set of graphical objects one by one. Execution of the instructions further causes the processor to receive the placement of each selected graphical object within the container. Each of the selected graphical objects are positioned by one of: snapping the position of the span to the non-empty gridline and positioning the span onto the container by adding a new gridline. Execution of the instructions further causes the processor to determine at least one pair of colliding gridlines. Colliding gridlines have a parallel direction and at least one pair of spans which at least partially overlap in the parallel direction. Execution of the instructions further causes the processor to insert page-layout constraints between the at least one pair of colliding gridlines.

In another aspect the invention provides for a method of solving a set of page layout constraints by a computer. The method comprises the step of receiving a set of page layout constraints. The method further comprises the step of dividing the set of page layout constraints into groups dependent upon the type of constraint. Each of the set of page layout constraints may be classified according to a type. The type may be descriptive of the relationship the constraint describes or of the values which are allowed by the constraint. For instance the page layout constraints may be divided into horizontal or vertical layout constraints. Each of the set of page layout constraints is a member of only one of the groups. The method further comprises the step of transforming each constraint of each group into a resource constraint. A resource constraint as used herein encompasses a scalar variable which is used to modify a constraint. A resource constraint may be useful when there is an over-constrained system of equations. The use of the scalar variables adds additional degrees of freedom which may be used to distribute a resource among a variety of constraints. The method further comprises the step of assigning a priority to each of the groups. The method further comprises the step of solving each of the groups in the order of the priority using a resource allocation algorithm. All members of the group chosen from the groups are solved simultaneously. This embodiment may be beneficial because it allows the solution of the page layout constraints in a situation when the equations may be over-constrained. This may be particularly beneficial because until the solving of the page layout constraints is commenced it may not be apparent that they are over-constrained.

In another aspect the resource allocation algorithm is a lexicographic scale maximization algorithm.

In another embodiment the step of solving each member of the group simultaneously using a resource allocation algorithm comprises the step of assigning an individual scale variable to each member of the group to form a set of scale variables. The step of solving each member of the group simultaneously using a resource algorithm further comprises repeatedly maximizing the values of all scale variables equally up to some upper bound. The step of solving each member of the group simultaneously using a resource algorithm further comprises repeatedly choosing binding constraints from the group of page layout constraints if the upper bound for the scale variables has not been reached. The binding constraints are chosen from the set of page layout constraints in a group with the smallest scale variables. The step of solving each member of the group simultaneously using a resource allocation algorithm further comprises repeatedly replacing the small-scale variables with a solution. Essentially the algorithm increases the value of all scale variables in the group of constraints equally. When all scale variable values hit the maximum possible value, the algorithm determines the set of scale variables that prevent the scale variable values from increasing further. These scale variables belong to binding constraints. The scale variables are replaced with the constant scale variable value. Thus, the scale variables of binding constraints are removed from the problem. The remaining scale variables can be further increased. This process is repeated iteratively until the upper bound has been reached or all scale variables have been replaced with a constant value. In this way the resource allocation between the various constraints is then maximized as much as possible.

In another aspect a subset of the page layout constraints are removed or modified. The subset of the page layout constraints which are removed or modified are constraints that cannot be satisfied. For instance if it is impossible to solve a set of equations because of a particular set of constraints, these constraints may be removed from the set of constraints.

In another aspect the set of page layout constraints define constraints between gridlines of a container. The container is for representing a page layout. The container contains a set of graphical objects. Each of the objects has a set of object gridlines for delineating important graphical features of the object. Each of the set of object gridlines has a span which is identical with one of the object of the gridline on the left and the object and the gridline intersect.

In another aspect the method further comprises the step of detecting an under-constrained condition between a pair of gridlines after solving each of the set of groups in order of the priority. The method further comprises the step of inserting an additional constraint between the pair of gridlines. The method further comprises the step of repeating the method of solving the set of page layout constraints after inserting the additional constraint. An under-constrained condition may for instance occur when two objects in for instance the vertical direction but do not have spans which directly collide with each other. Because these spans do not collide there was no page layout constraint inserted.

In another aspect the under-constrained condition is detected by a change in the ordering of the pair of gridlines. This is beneficial because it is very difficult to detect under-constrained conditions a priori. If for instance in the previous example two non-overlapping objects do not have colliding spans there may be a situation where the two objects overlap after the solution of the page layout constraints is complete. If the objects overlap, some of their gridlines changed order during the page layout solution algorithm and this can be detected. If the order changes this may be an indication that additional constraints need to be inserted. In a very simple case this could be for instance achieved by inserting constraints between gridlines that have re-ordered.

In another aspect the step of receiving the set of page layout constraints comprises providing a container for representing the page layout. The container is delineated by an existing set of gridlines. The step of receiving the set of page layout constraints further comprises providing the set of graphical objects. The step of receiving the set of page layout constraints further comprises selecting the set of graphical objects one by one. The step of receiving the set of page layout constraints further comprises placing each selected graphical object within the container. Placing each of the selected graphical objects are positioned one by one of: snapping the position of the span to a non-empty gridline and positioning the span onto the container by adding a new gridline. The step of receiving the set of page layout constraints further comprises determining at least one pair of colliding gridlines. The colliding gridlines have a parallel direction and at least one pair of spans which at least partially overlap in the parallel direction. The step of receiving the set of page layout constraints further comprises inserting new page layout constraints between the at least one pair of colliding gridlines.

In another embodiment the new page layout constraints are added to the set of page layout constraints. In other words the page layout constraints are built up as additional graphical objects are selected and positioned within the container.

In another embodiment there are multiple graphical objects chosen from the set of graphical objects that contain text. At least a portion of the multiple graphical objects have an alignment constraint. The alignment constraint specifies an alignment of any one of the following: left, center, right, top, bottom, and vertical center. The portion of the multiple aligned graphical objects have a text alignment. The text alignment can be any one of the following: horizontal left alignment, horizontal center alignment, horizontal right alignment, vertical top alignment, vertical center alignment, and vertical bottom alignment. The method further comprises calculating a text margin for the portion of the multiple graphical objects. The method further comprises the step of applying the text margin to each of the portion of the multiple graphical objects.

Horizontal left alignment may refer to left justified text. Horizontal center alignment may refer to center justified text. Horizontal right alignment may refer to right justified text. Vertical top alignment may refer to aligning the text with the top of the graphical object. Vertical center alignment may refer to aligning the text with a vertical centerline of the graphical object Vertical bottom alignment may refer to the aligning of the text with the bottom of the graphical object.

In another embodiment the method is applied to a multiple page document. The multiple page document comprises multiple pages each represented by one of a set of multiple containers. The method further comprises the step of selecting a gridline from a first page of the multiple page document. The method further comprises the step of inserting a copy of the gridline into the second page of the multiple page document. The gridline and the copy of the gridline are logically linked to form a global gridline. The global gridline has the same position in both the first page and the second page.

In another embodiment a graphical object chosen from the set of graphical objects contains a content element. The content element is text. The method further comprises the step of determining a width and height configuration of the text by determining a set of possible width and height configurations of the text. The determination of the width and height configuration further comprises linearly approximating the set of possible width and height configurations. The determination of the width and height configuration of the text further comprises selecting the width and height configuration of the text by evaluating the linear approximation with a predetermined optimization function. Essentially a function is used to choose the width and height configuration. The linear approximation can be fit into the predetermined optimizing function and used to select optimal width and height configuration.

In another embodiment the method further comprises resolving the set of page constraints after fixing the width of the text. The width of the text remains fixed during the resolving of the set of page constraints.

In another embodiment the predetermined optimizing function preferentially selects a line width of 55 characters.

In another embodiment the multiple graphical objects contain text. Each of the multiple graphical objects has a set of linear constraints approximating minimum width-height ratios. Each graphical object has a width expressed in terms of a percentage of a preferred width. The width of each of the multiple graphical objects may be set to a fixed value. The method further comprises iteratively searching the multiple graphical objects for the graphical object with the smallest percentage and whose width is not fixed. The method further comprises iteratively fixing the width of the graphical object with the smallest percentage if its percentage is within a predetermined range of the preferred width. The method further comprises iteratively increasing the width of a graphical object with the smallest percentage if its percentage is not within a predetermined range of the preferred width.

For instance there may be a situation where there are n text boxes on a slide. Each text box is constrained by a set of linear constraints approximating the minimum width and height configuration. Each text box has a preferred width corresponding roughly to the width of 55 characters given the text box font size. The width of each text box can be expressed as a percentage of the preferred width. An example of a method according to this embodiment may be first searching a text box with the smallest such percentage x whose width is not yet fixed. If no such text box exists then the method is finished. If the text box is found and it is at its preferred width already the width is fixed. The method further comprises then searching for the next text box with the smallest such percentage x whose width is not yet fixed. If a text box is not found at its preferred width then the width is changed by one step to the next widest possible line break. This is done to the next width resulting in one less line in some embodiments. This is done while guaranteeing that all other text boxes do not become worse than the percentage x. If it is able to be accomplished the method proceeds back to searching for the text box with the smallest such percentage x whose width is not yet fixed. If this is not able to be performed the text box width is fixed at its previous width and the method returns to search for the text box with the smallest such percentage x whose width is not yet fixed. These following steps are repeated over and over again until the width of the text boxes is optimized.

In another embodiment the multiple graphical objects are distributed on separate pages. The text in each of the multiple graphical objects is identical. In some embodiments the text and the line breaks may be identical but the font and/or font size may be different. This allows for a more efficient layout in configuration of the text but keeping the same text line breaks makes the text easier to read from slide to slide.

The best line breaks can be found for text boxes with the same text but different font styling which may even be different on different slides. The algorithm can be changed so that each text box is in fact a list of text boxes with the same text and each percentage of the text box width relative to the preferred width is in fact a list of percentages ordered from smallest to biggest. These lists are compared lexicographically.

In another embodiment the method further comprises resolving the set of page constraints after fixing the width of the graphical objects. The width of the graphical objects remains fixed during the resolving of the set of page constraints. For instance in this embodiment the width of the text objects may first be fixed and then the set of page constraints is resolved or solved.

Once the layout algorithm has found an optimal text box size given the approximate linear width and height constraints the page layout can be further improved. The linear approximation of width-height constraints introduces approximation errors. The text sizes calculated using those constraints are not tight around the text. Thus the page layout may be improved by solving the layout program again without the linear approximations and with only a single constraint for text box that tries to enforce the previously calculated best and tight text box size.

In some embodiments each text box has a margin around the text. The size of the margin depends upon the font size. The text boxes may be aligned on one side to achieve the same margin regardless of the different font sizes. In some embodiments the text boxes coordinate their margins effectively.

In another embodiment at least a portion of the multiple graphical objects have an alignment constraint. The alignment constraint specifies an alignment of any one of the following: left, center, right, top, bottom, and vertical center. The method further comprises aligning the portion of the multiple graphical objects in accordance with the alignment constraint.

In some embodiments the user can change the text alignment interactively between left, center, right, top, bottom, vertical center and the page layout algorithm achieves an optimal margin on the aligned side considering adjacent and aligned text boxes.

In another embodiment a subset of the set of graphical objects has an alignment constraint. The alignment constraint is anyone of the following: a left alignment, a right alignment, a horizontal center alignment, a top alignment, vertical center alignment, and bottom alignment. The method further comprises the step of aligning the subset according to the group alignment constraint. The method further comprises the step of moving any member of the subset if it is unable to be aligned with the subset.

In some embodiments a set of shapes can be left, right, top, or bottom aligned. The solver tries to achieve the desired alignment without violating page layout constraints. Thus shapes cannot move through each other for example. If given a set of page layout constraints one of the shapes cannot be aligned with the others it will be moved as close as possible to the alignment location and its position is fixed to indicate which shape had a problem achieving the alignment.

In another embodiment the set of page layout constraints contains manually set positions, sizes, and distances. Manually set positions, sizes and distances remain fixed during the solving of the set of page layout constraints. For instance the set of page layout constraints may contain special constraints which delineate the position, size or distances as being input explicitly by an operator or user. Such constraints may remain fixed during the solving of the set of page layout constraints.

The page layout solver respects manually positioned shapes, i.e. gridlines. User decisions are never overridden even if that introduces over-constraintness in other parts of the layout.

In another embodiment the method further comprises the step of repositioning and resizing the graphical objects using the page layout constraints.

In another embodiment the method further comprises displaying the container with the graphical object after repositioning and re-sizing the graphical objects within the container.

The page layout constraints define the page layout of any one of the following: a presentation slide, a book page, multiple book pages, a webpage, an advertisement, a magazine page, and multiple magazine pages.

In another aspect the invention provides for a non-transitory computer-readable storage medium containing machine-executable instructions for execution by a processor. Execution of the instructions causes the processor to receive a set of page layout constraints. Execution of the instructions further causes the processor to divide the set of page layout constraints into groups dependent upon the type of constraint. Each of the set of page layout constraints is a member of only one of the groups. Execution of the instructions further causes the processor to transform each constraint of each of the groups into a resource constraint. Execution of the instructions further causes the processor to assign a priority to each of the groups. Execution of the instructions further causes the processor to solve each of the groups in the order of the priority using a resource allocation algorithm. All members of each of the groups are solved simultaneously.

In another aspect the invention provides for a computer system comprising a processor. The computer system further comprises a memory containing machine-executable instructions. Execution of the instructions causes the processor to receive a set of page layout constraints. Execution of the instructions further causes the processor to divide the set of page layout constraints into groups dependent upon the type of constraints. Each of the set of page layout constraints is a member of only one group. Execution of the instructions further causes the processor to transform each constraint of each of the groups into a resource constraint. Execution of the instructions further causes the processor to assign a priority to each of the groups. Execution of the instructions further causes the processor to solve each of the groups in the order of the priority using a resource allocation algorithm. All members of each of the groups are solved simultaneously.

BRIEF DESCRIPTION OF THE DRAWINGS

In the following embodiments of the invention are explained in greater detail, by way of example only, making reference to the drawings in which.

DETAILED DESCRIPTION

Like numbered elements in these figures are either equivalent elements or perform the same function. Elements which have been discussed previously will not necessarily be discussed in later figures if the function is equivalent.

Figure 1:
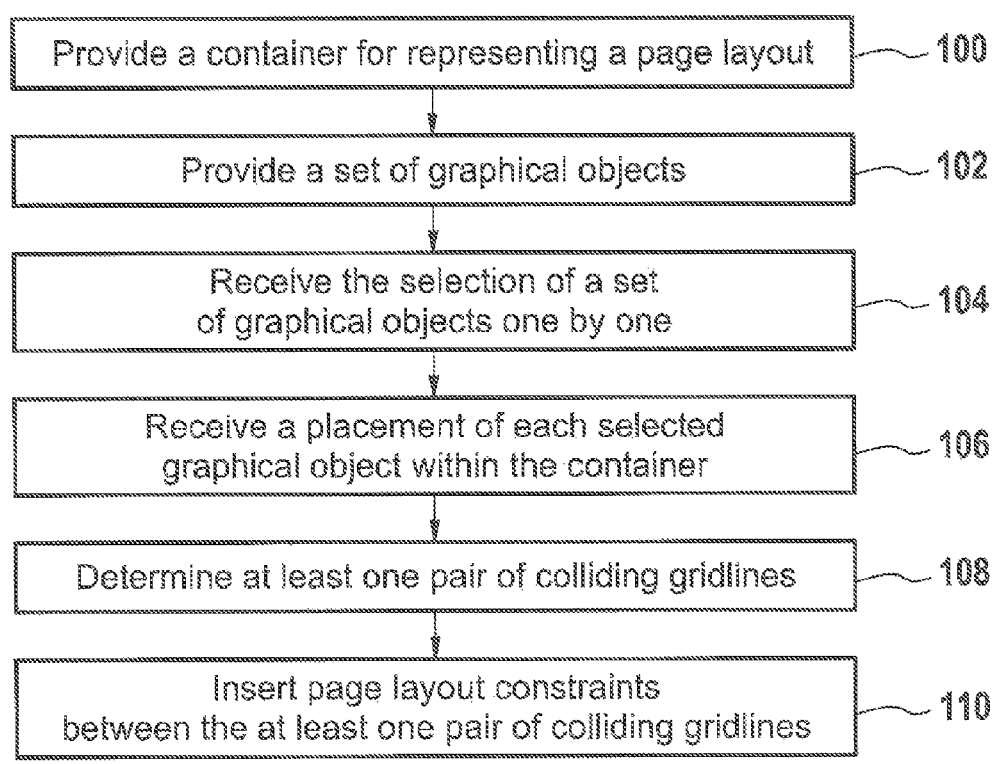
FIG. 1 shows a flow diagram which illustrates a method according to an embodiment of the invention.

FIG. 1 shows a flow diagram which illustrates a method according to an embodiment of the invention. First in step 100 a container is provided for representing a page layout. Next a set of graphical objects is provided in step 102. In step 104 the selection of a set of graphical objects is received one by one. Next in step 106 the placement for each of the selected graphical objects within the container is received. Next in step 108 at least one pair of colliding gridlines is determined. In step 110 page layout constraints are inserted between the at least one pair of colliding gridlines.

Figure 2:
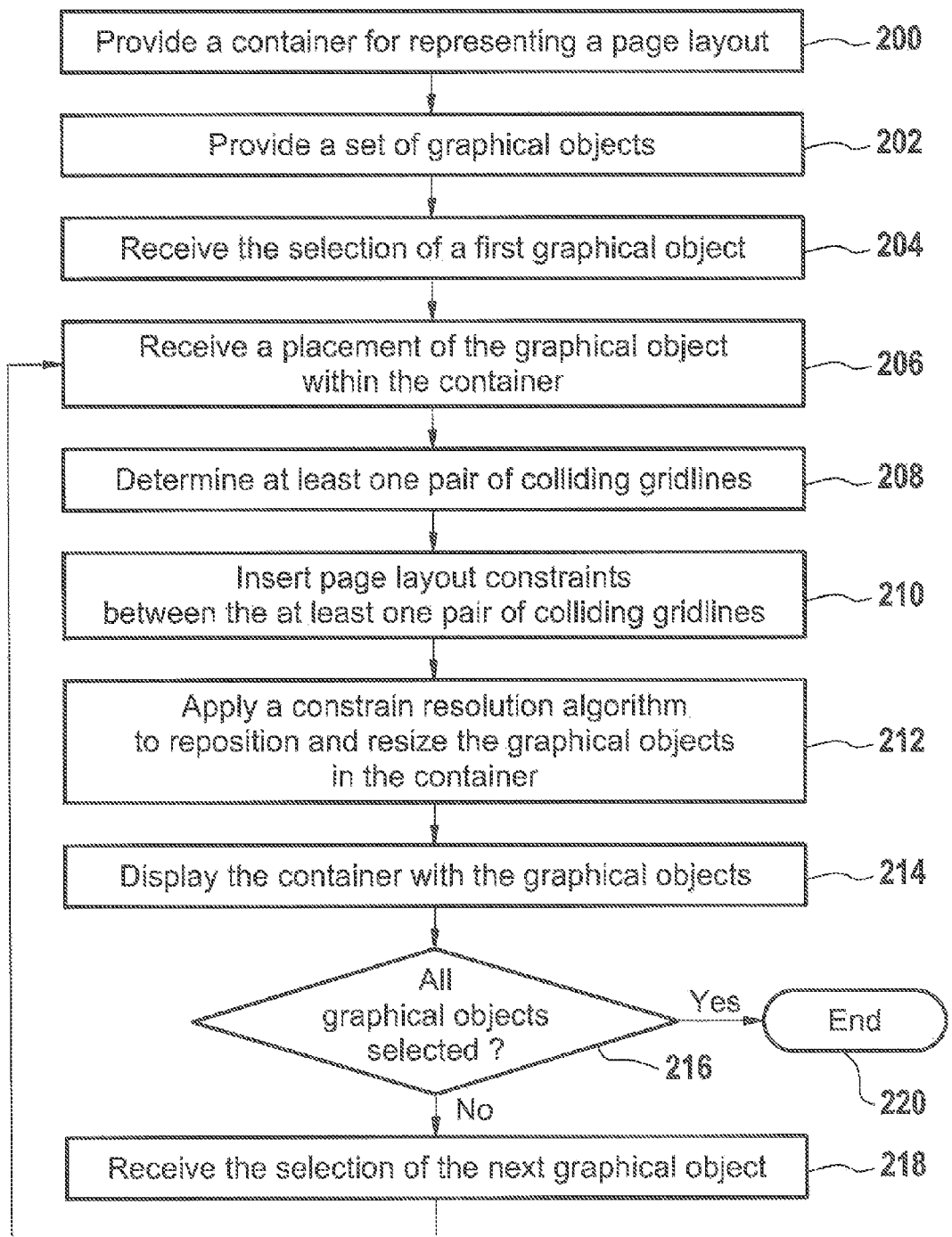
FIG. 2 shows a flow diagram which illustrates a method according to a further embodiment of the invention.

FIG. 2 shows a flow diagram which illustrates the method according to a further embodiment of the invention. First in step 200 a container for representing a page-layout is provided. Next in step 202 a set of graphical objects is provided. In step 204 the selection of a first graphical object is received. Next in step 206 a placement of the graphical object within the container is received. For instance the graphical object may have been dropped into a graphical user interface representing the page-layout or the container. Next in step 208 at least one pair of colliding gridlines is determined. In step 210 page-layout constraints between the at least one pair of colliding gridlines are inserted. Next in step 212 a constraint resolution algorithm is applied to solve the page-layout constraints and to reposition and resize the graphical objects in the container. In step 214 the container with the repositioned and resized graphical objects is displayed. For instance the display may be performed on a computer monitor. Box 216 is a decision box. Are all of the graphical objects selected. If the answer is no then the selection of the next graphical object is received in box 218. The method then repeats steps 206, 208, 210, 212 and 214 until all of the graphical objects have been selected. After the next graphical object is selected then a placement of the next graphical object is received within the container. Once all of the graphical objects have been selected the method ends at step 220.

Figure 3:
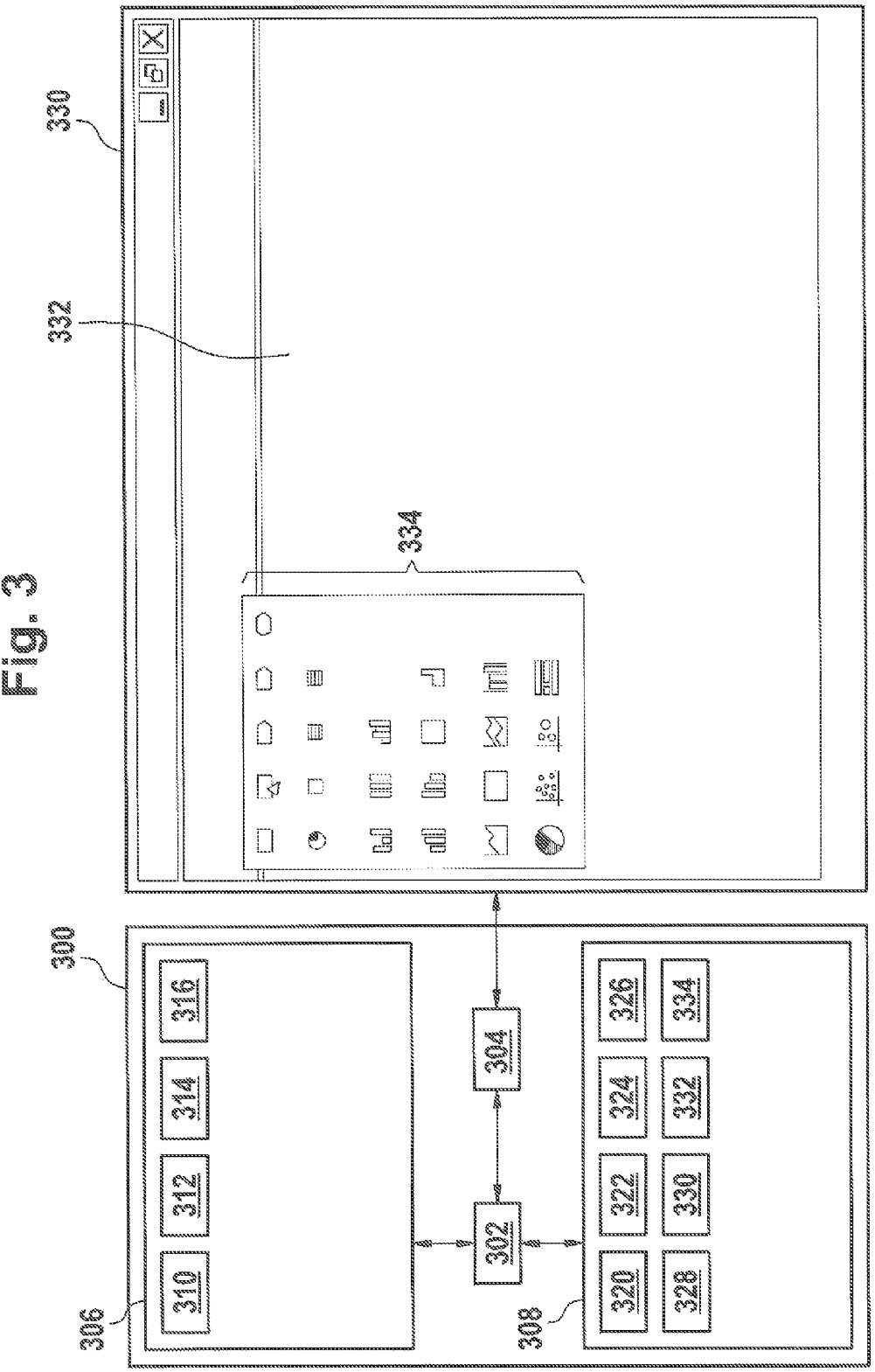
FIG. 3 shows a computer system according to an embodiment of the invention.

FIG. 3 shows a computer system 300 according to an embodiment of the invention. The computer system 300 comprises a processor 302 which is able to communicate with a user interface 304, computer storage 306, and computer memory 308. The computer storage 306 is shown as containing a container 310. The container 310 is a data structure for storing the gridlines and objects for defining a page-layout. The computer storage 306 is further shown as containing a set of page-layout constraints 312. The computer storage 306 is further shown as containing a set of graphical objects 314. The computer storage 306 is further shown as containing a page-layout 316 that has been generated using the container 310 and the page-layout constraints 312.

The computer memory 308 is shown as containing a page-layout program 320. The page-layout program contains computer executable code for executing an embodiment of a method according to the invention. The computer memory 308 is further shown as containing a gridline collision module 322. The gridline collision module 322 is configured for detecting gridline collisions between spans defined in the container 310. The computer memory 308 is further shown as containing a page-layout insertion module. The page-layout insertion module 324 contains computer executable code which enables the page-layout program 320 to insert graphical objects 314 into the container 310.

The computer memory 308 is shown as further containing a constraint resolution algorithm module 326. The constraint resolution algorithm module 326 contains computer executable code for solving the page-layout constraints 312 of the data structures represented within container 310 to solve for the page-layout 316. The computer memory 308 is further shown as containing a graphical user interface module 328.

The graphical user interface 328 is configured for driving and controlling a graphical user interface used for controlling the page-layout program 320 and also for rendering the contents of the container 310 and/or the calculated page-layout 316. The user interface 304 is shown as having a graphical user interface 330. The graphical user interface 330 could for example be displayed on a computer monitor or a touch screen.

The graphical user interface is shown as having a canvas 332. The canvas 332 is used to represent a rendering of the contents of the container 310 and/or the page layout 316. In this example a palette of shapes is shown which illustrates how it can be used to provide a set of graphical objects 334. The graphical objects 334 can be inserted into the canvas 332 by dropping and dragging them there.

Figure 4:
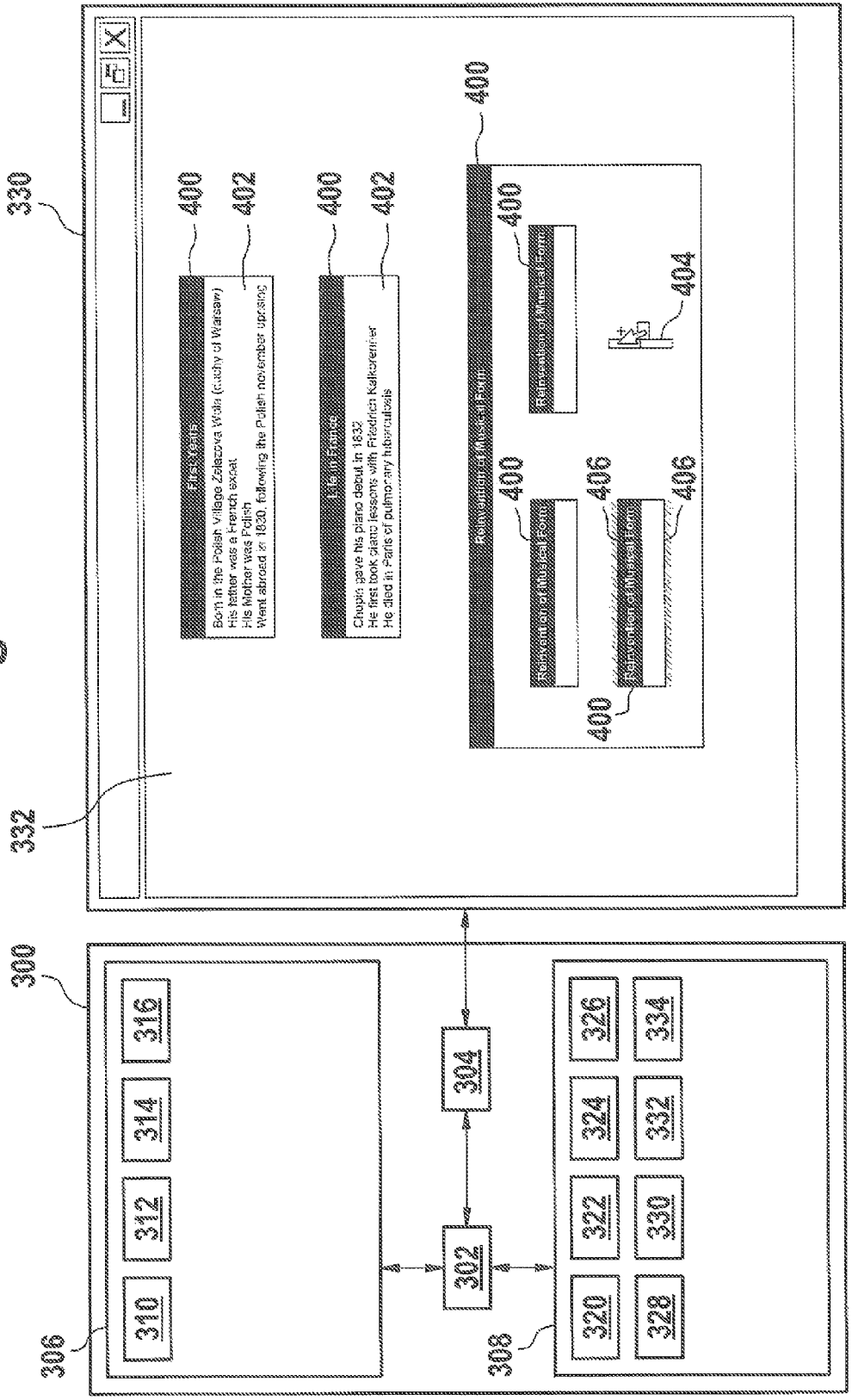
FIG. 4 shows the computer system shown in FIG. 3.

FIG. 4 shows another view of the computer system 300 shown in FIG. 3. In FIG. 4 a different view of the graphical user interface 330 is presented. In this example on the canvas 332 there are a number of box graphical objects 400 distributed. Several of the box graphical objects have text 402 within them. In this example another box graphical object an insertion graphical object 404 is being inserted. It is currently being aligned with two spans 406 of a box graphical user interface. The highlighted spans 406 show that the insertion graphical object 404 will be aligned with these two spans 406.

Figure 5:
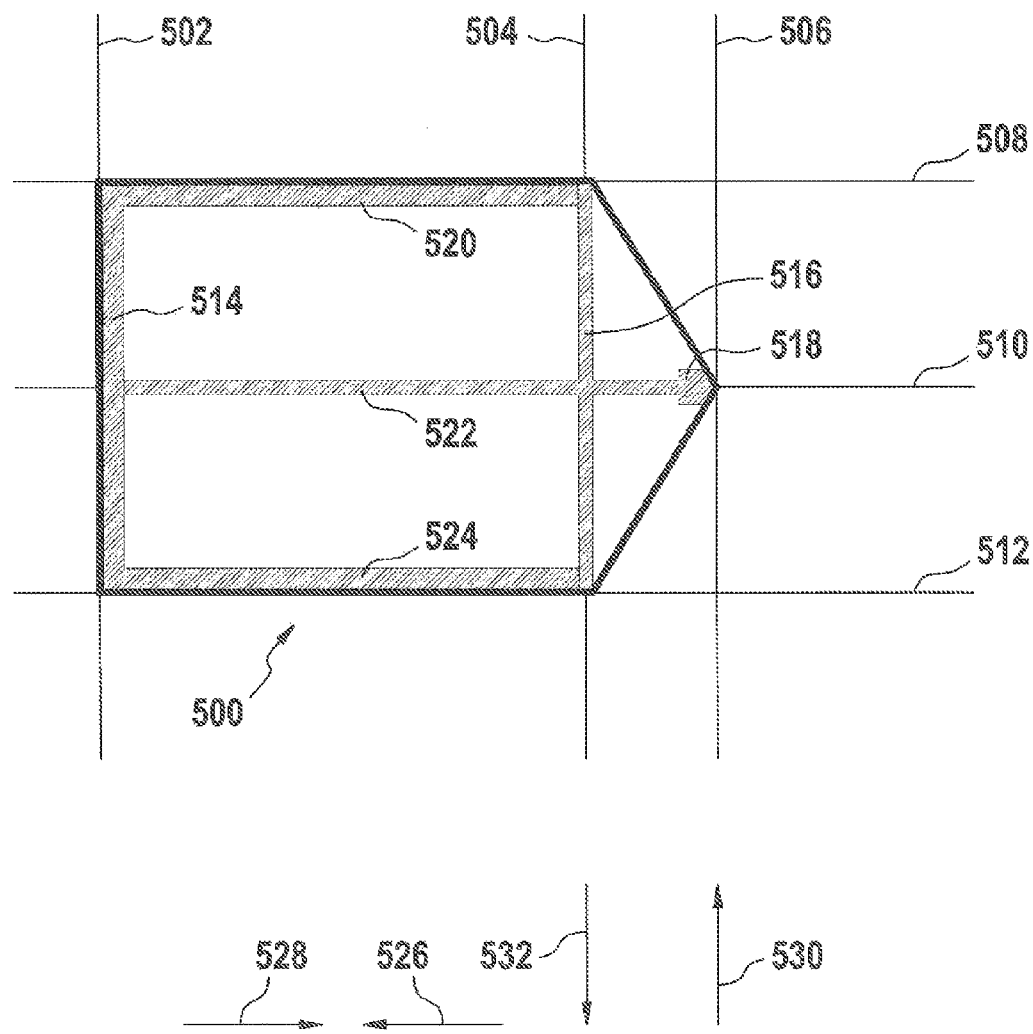
FIG. 5 illustrates a graphical object according to an embodiment of the invention.

FIG. 5 shows an example of a graphical object 500 according to an embodiment of the invention. In this example the object is a pentagon. There is a first vertical gridline 502, a second vertical gridline 504, and a third vertical gridline 506. There is also a first horizontal gridline 508, a second horizontal gridline 510, and a third horizontal gridline 512. These gridlines 502-512 define the important geometric features of the graphical object 500. Along first vertical gridline 502 is a vertical low span 514. Along vertical gridline 504 is an interior vertical span 516. Along third vertical gridline 506 is a vertical high span 518. The vertical high span 518 is a tangent point. Along horizontal gridline 508 is horizontal low span 520. Along the second horizontal gridline 510 is a horizontal interior span 522. Along horizontal gridline 512 is a horizontal high span 524. The arrow 526 illustrates a first horizontal direction and the arrow 528 illustrates a second horizontal direction. The arrow 530 illustrates a first vertical direction and the arrow 532 illustrates a second vertical direction. If the direction of the arrows 526, 528, 530, 532 were flipped then the definition of the high and low gridlines would also flip.

A graphical object is attached to gridline objects and the graphical object defines a span on each attached gridline. Additionally a name may also be assigned to each attached gridline. This is illustrated in FIGS. 6 and 7.

Figure 6:
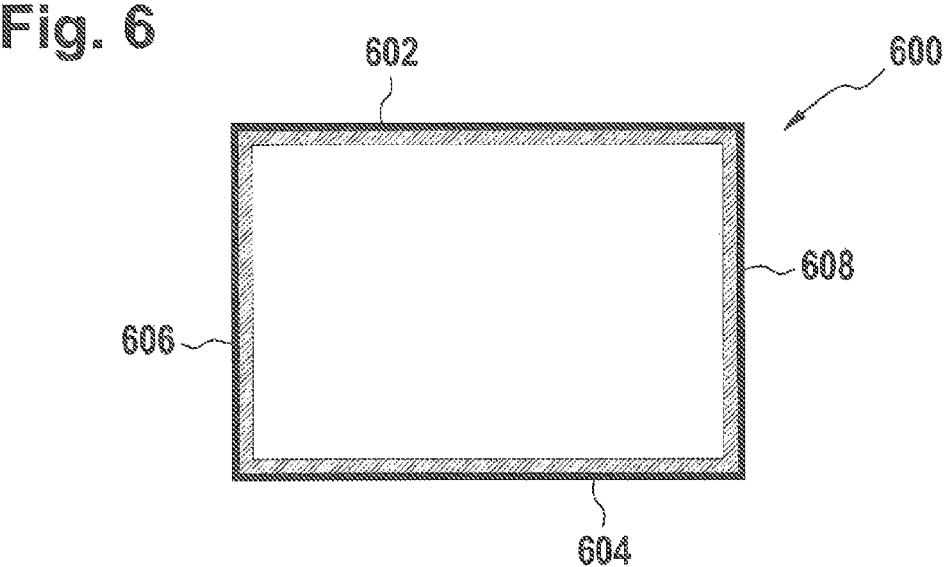
FIG. 6 illustrates a rectangle with gridlines and spans.

FIG. 6 illustrates a simple rectangle with its spans and the gridline names assigned to it. FIG. 6 shows a simple box graphical object 600. The top of the box 602 is labeled the low y box gridline. The lower line 604 is labeled the high y box gridline. The edge on the left 606 is labeled the low x box gridline. On the right the span 608 is labeled the high x box gridline.

Figure 7:
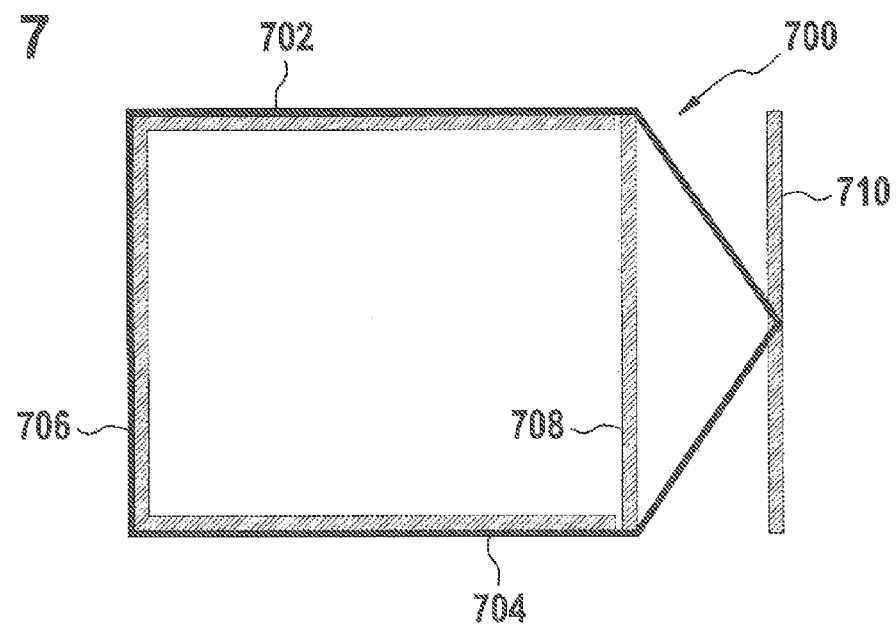
FIG. 7 illustrates a pentagon with gridlines and spans.

FIG. 7 illustrates the same for a pentagon. Note that in this view a vertical middle gridline as shown in FIG. 5 is not shown. The top span 702 is a low y box gridline and is named the pentagon vertical low gridline. On the bottom the span 704 is labeled the high y box gridline or the pentagon vertical high gridline. On the left the span is equivalent to the low x box gridline and is labeled the high pentagon back 706. The interior span 708 is equivalent to the high x box gridline and is labeled the high pentagon arrow head base. The span 710 goes through the tip of the pentagon and is labeled 710. It is labeled the high pentagon tip. FIG. 7 illustrates an alternative way of labeling a tangent point. In FIG. 5 only a point was highlighted as a span. In this example the span 710 has the same lengths as spans 706 and 708. Given the names illustrated in FIGS. 6 and 7 rules can be defined that may be applied when the user snaps an inserted object to existing objects.

Figure 8:
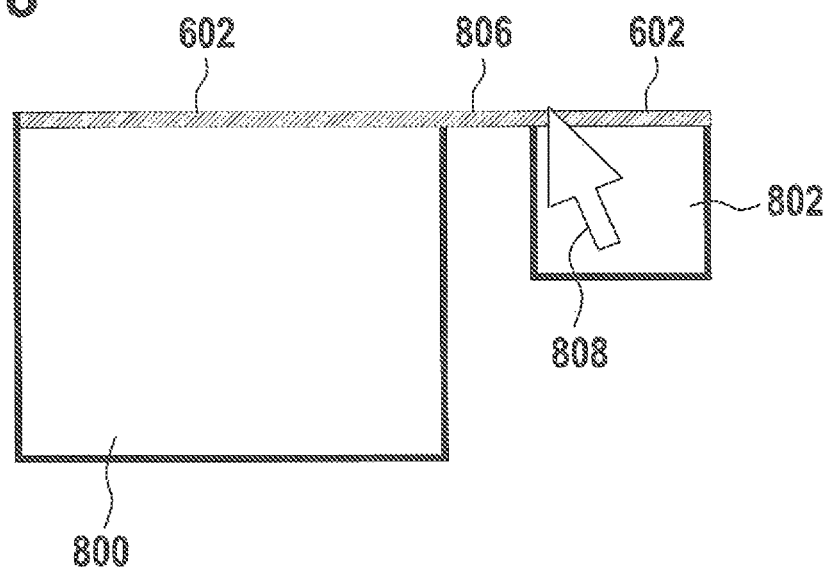
FIG. 8 illustrates the insertion of a graphical object into a container.

In FIG. 8 there is an existing graphical object 800. A mouse cursor 804 is used to insert an inserted graphical object 802. The highlighted spans 806 illustrates the alignment between the existing graphical object 800 and the inserted graphical object 802. In this example two box graphical objects have been inserted. The highlighted spans 806 in both examples are both low y box gridlines. In fact, we have snapped the low y box gridline of the existing object to the low y box gridline of the inserted object. With this information we can then define an if/then snapping rule of the form.

IF GRIDLINE A OF OBJECT 1 IS SNAPPED TO GRIDLINE A' OF OBJECT 2
    THEN SNAP GRIDLINE B OF OBJECT 1 TO GRIDLINE B' OF OBJECT 2 or short: (GRIDLINE A, GRIDLINE A')->(GRIDLINE B, GRIDLINE B')

Figure 9:
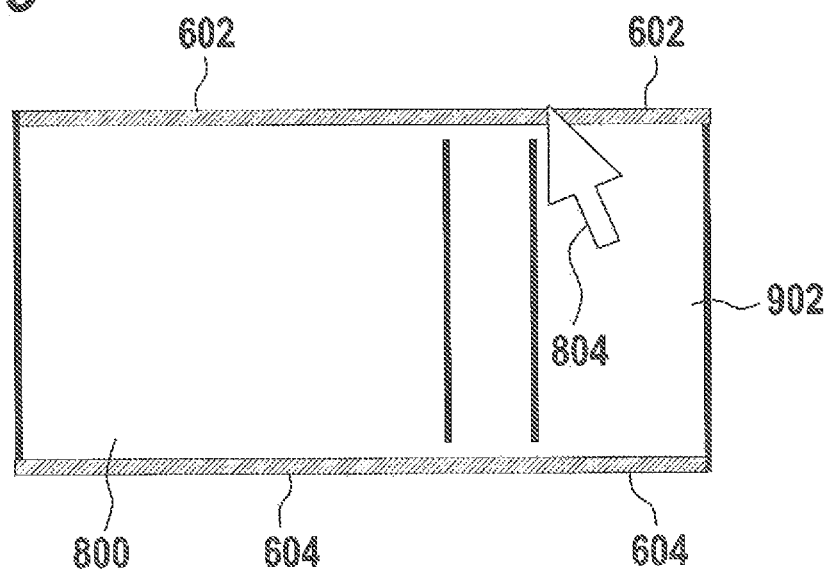
FIG. 9 illustrates the insertion of a graphical object into a container.

FIG. 9 shows a similar example. The modified rule has been applied and in addition the high y box gridline 604 of both the existing graphical object 800 and the inserted graphical object 902 have been snapped together. In other words, with a rule (LOW Y BOX, LOW Y BOX)->(HIGH Y BOX, HIGH Y BOX) the shapes shown in FIG. 8 can be changed to the shapes shown in FIG. 9. The power of the rule mechanism becomes obvious in more complicated situations.

Figure 10:
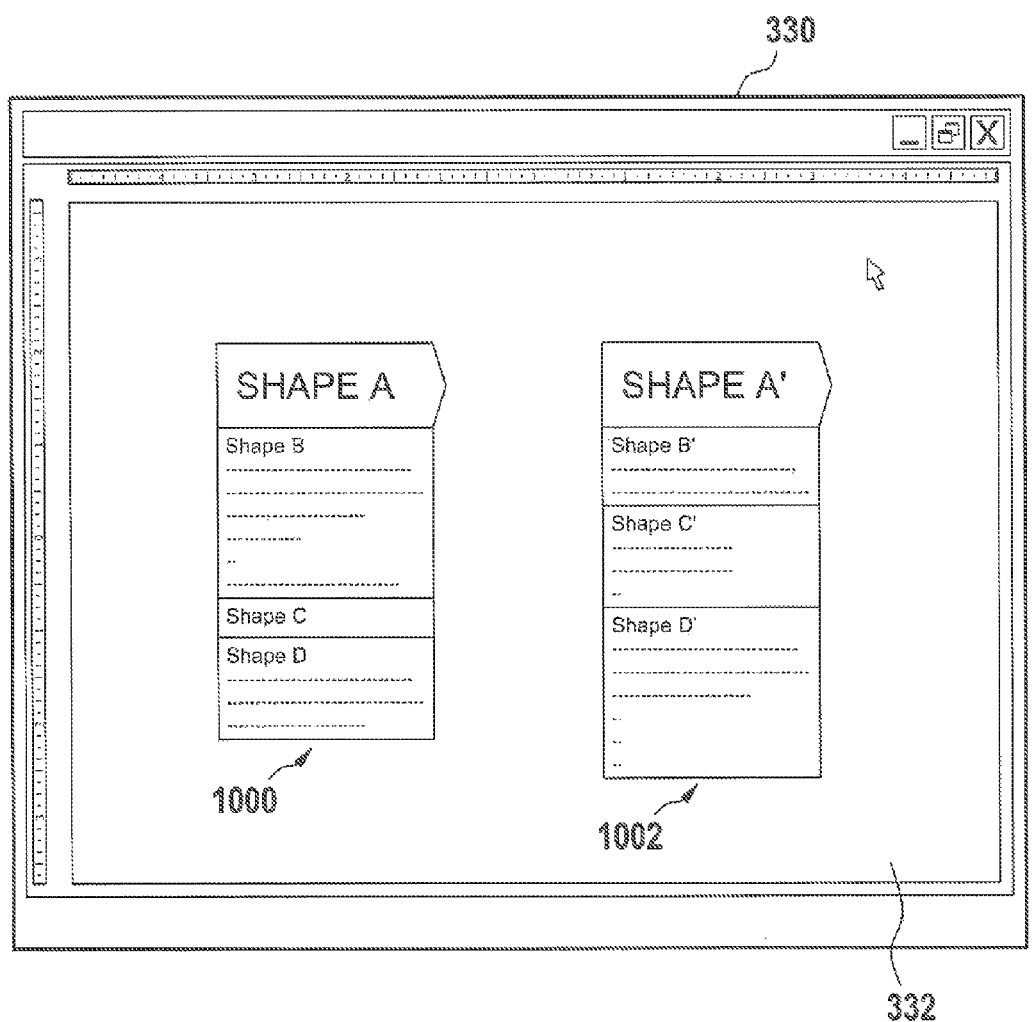
FIGS. 10 through 14 illustrate the cutting and pasting a graphical object from a canvas back into the canvas using a graphical user interface.
Figure 11:
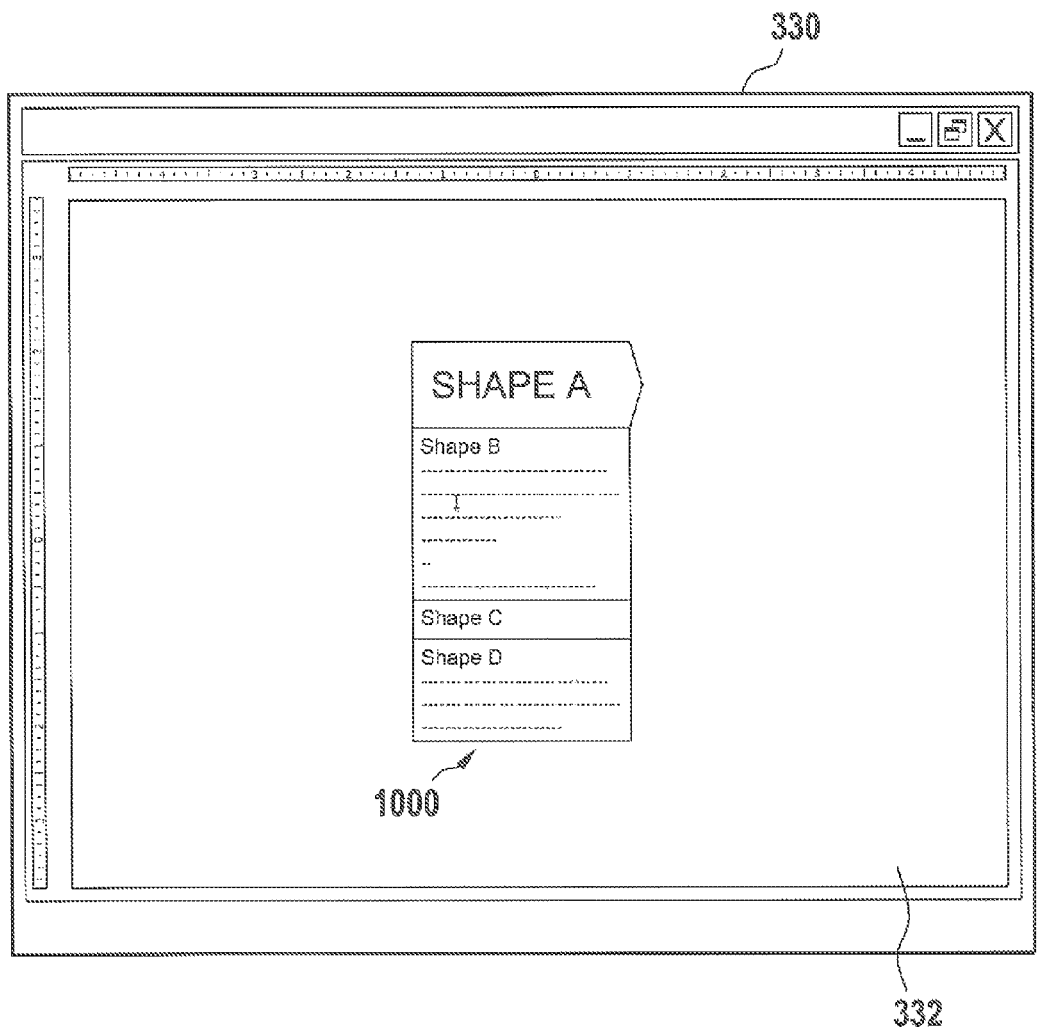
Figure 12:
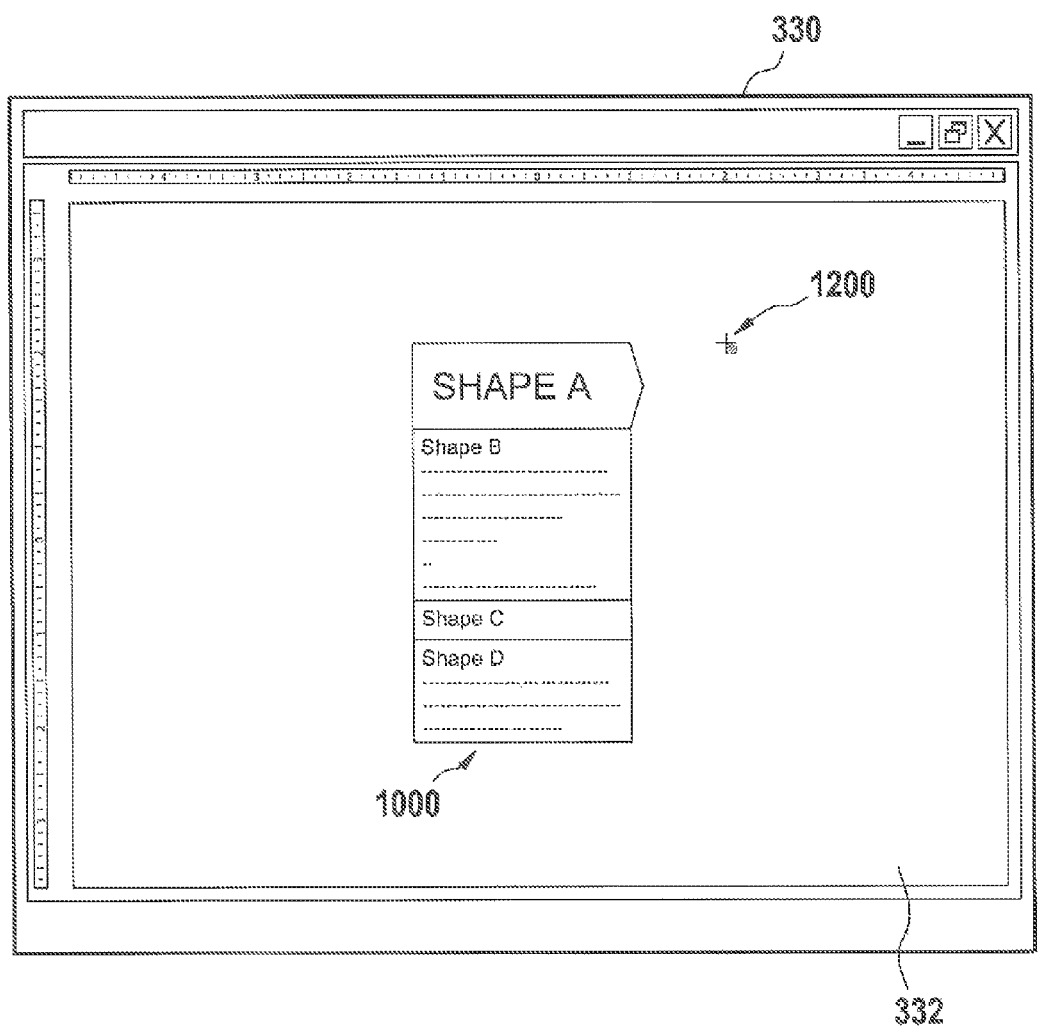

FIG. 10 shows the graphical user interface 330. On the canvas 332 is shown a first column 1000 and a second column 1002. The two columns 1000, 1002 each have a pentagon and three rectangles of different heights. The user now selects the second column 1002 and copies it to the clipboard and deletes it. After the second column 1002 has been deleted FIG. 11 shows the result. The column 1000 is centered in the center of the canvas 332. Next FIG. 12, the second column 1002 is pasted again in step 1200 and the insertion indication follows the mouse cursor 1200 to visualize where the column 1002 will be inserted.

Figure 13:
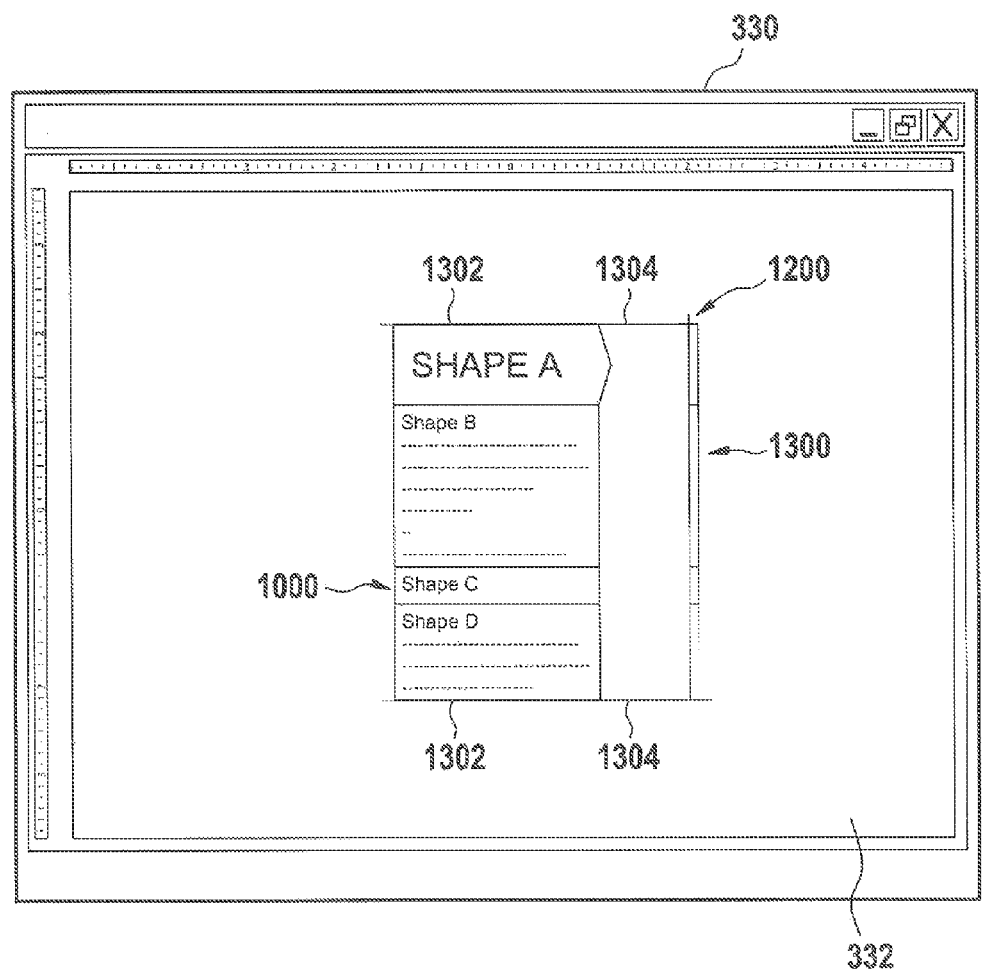
Figure 14:
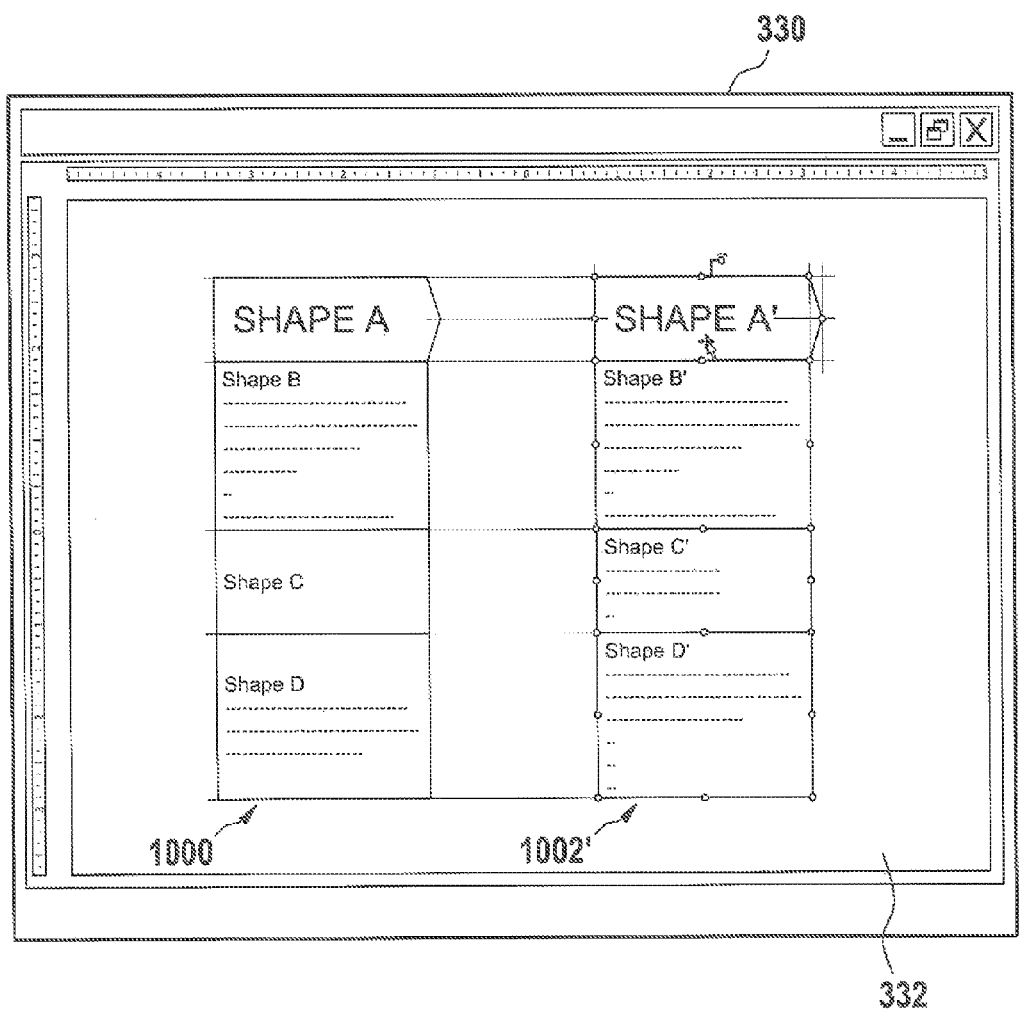

Next in FIG. 13 when the user snaps to the top of the left column the rule application mechanism automatically aligns the inserted column automatically with the existing column through the successive application of the same aforementioned alignment rule. In FIG. 13 there is an insertion object 1300 which represents the insertion of the second column 1002. The cursor position 1200 has been aligned with the upper span of the first column 1002. The insertion object 1300 is shown as being aligned with two highlighted spans 1302. As a further graphical aid a portion of the gridlines 1304 is also rendered on the canvas 332. The highlighting of the spans 1302 and the showing of the gridlines 1304 helps the operator to understand the constraints that will be added to the page layout. In FIG. 14 the result of re-pasting the second column 1002' back into the canvas 332 is shown. In the resulting layout, each row of the left and right columns 1000, 1002' have been aligned and the layout algorithm has found the best real heights to satisfy this alignment.

Figure 15:
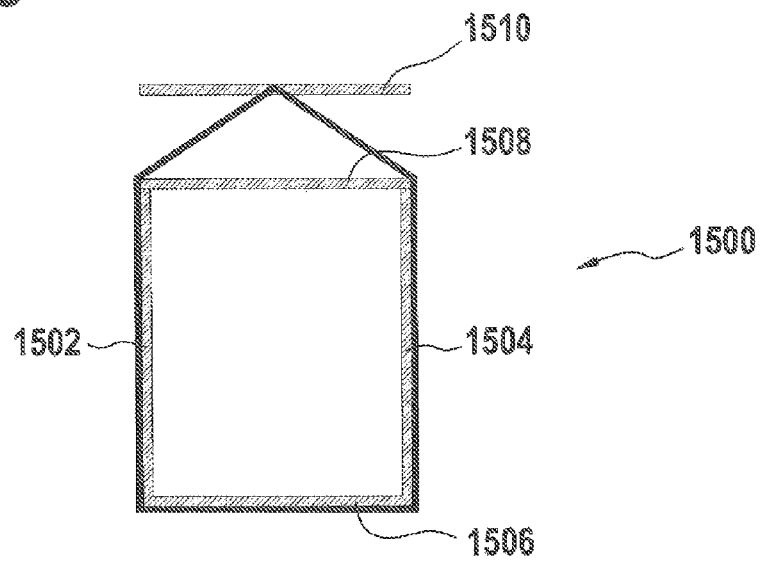
FIGS. 15 and 16 show the naming of spans of a pentagon and a chevron.

In FIG. 15 pentagon gridlines are described regardless of the pentagon orientation. In this example the pentagon tip is facing upwards. On the left the span 1502 is labeled pentagon vert low. The span on the right 1504 is labeled the pentagon vert high. At the bottom position the span 1506 is labeled low pentagon back. The interior span 1508 is labeled low pentagon arrow head base. The span 1510 is labeled the low pentagon tip 1510.

Figure 16:
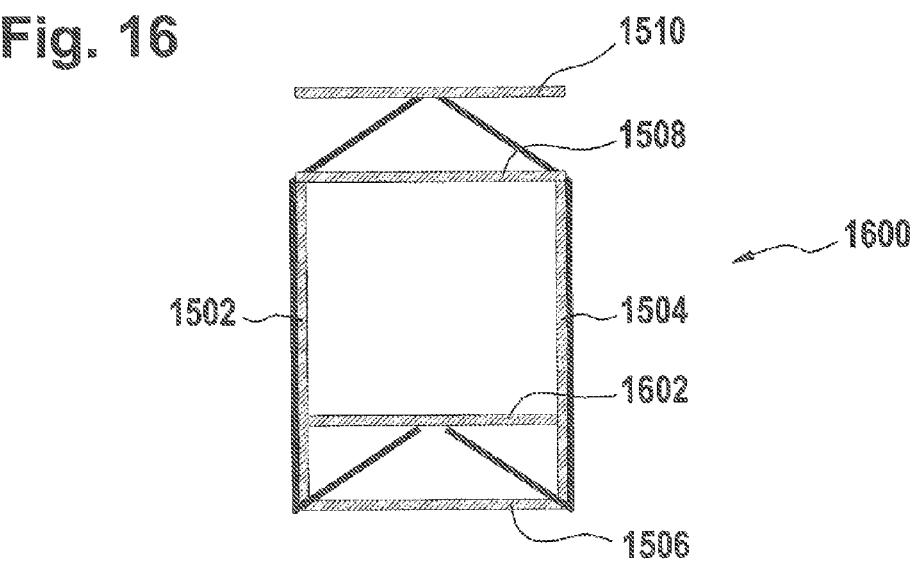

In FIG. 16 the pentagon 15 of FIG. 15 has been transformed into a chevron 1600. The spans are labeled identically with that as shown in FIG. 15 except an additional span 1602 has been added. This additional span 1602 is labeled the low chevron or low pseudo chevron.

The labeling in FIGS. 15 and 16 can now be used to define more complex rules to align chevrons and pentagons. For example:
(PENTAGON VERT LOW, PENTAGON VERT LOW) (PENTAGON VERT HIGH, PENTAGON VERT HIGH) (HIGH PENTAGON BACK, HIGH PENTAGON ARROW HEAD BASE)->(PENTAGON VERT MIDDLE, PENTAGON VERT MIDDLE) (HIGH PENTAGON CHEVRON, HIGH PENTAGON TIP)

This rule means that if Chevron A and Chevron B are top- and bottom aligned and the back of chevron A is aligned with the Arrowhead base gridline of Chevron B, align the chevron gridline of Chevron A with the tip of Chevron B.

Figure 17:
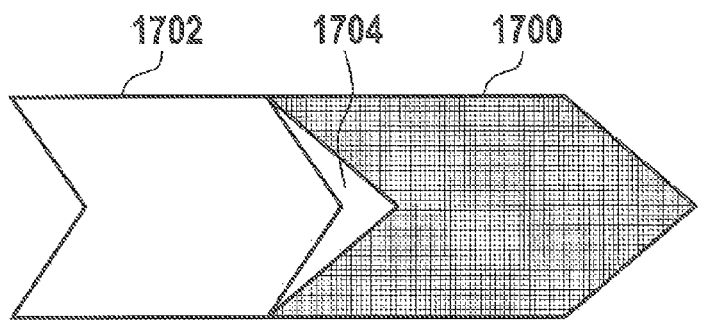
FIGS. 17 to 20 illustrate the alignment of two chevrons using a predetermined rule.
Figure 18:
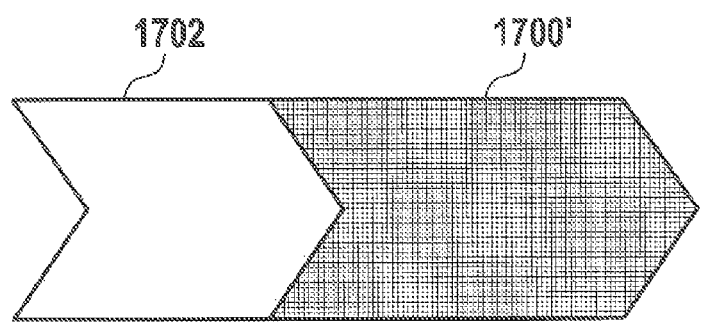

The application of these rules is illustrated in FIGS. 17-20. In FIG. 17 chevron A 1700 is aligned on the tip of chevron B 1702. However, there is a gap 1704 between chevron A 1700 and chevron B 1702. FIG. 18 shows the results of applying the above rules to the Figs. shown in FIG. 17. If chevron A and chevron B are top and bottom aligned and the back of chevron A is aligned with the arrow head base gridline of chevron B align the chevron gridline of chevron A with the tip of chevron B. The result is that the gap 1704 shown in FIG. 17 has disappeared and the two chevrons 1700', 1702 are perfectly aligned now. The rules are considered to be symmetrical.

Figure 19:
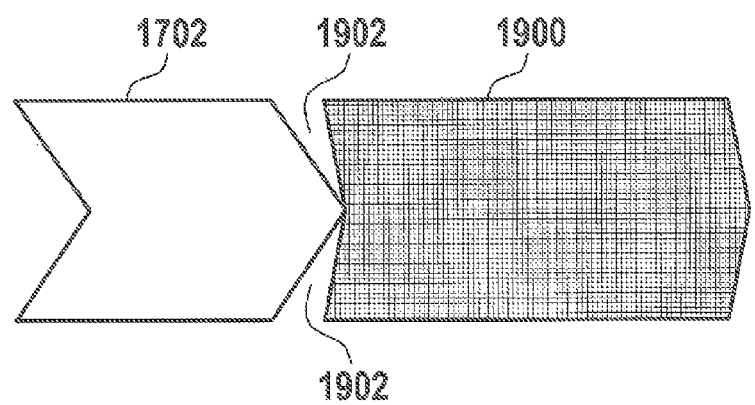

FIG. 19 shows another situation where these rules are equally applicable. In FIG. 19 chevron A 1900 is aligned with chevron B 1702. Then the two chevrons 1702, 1900 are not perfectly compatible and there is extra space 1902 between the two chevrons 1702, 1900.

Figure 20:
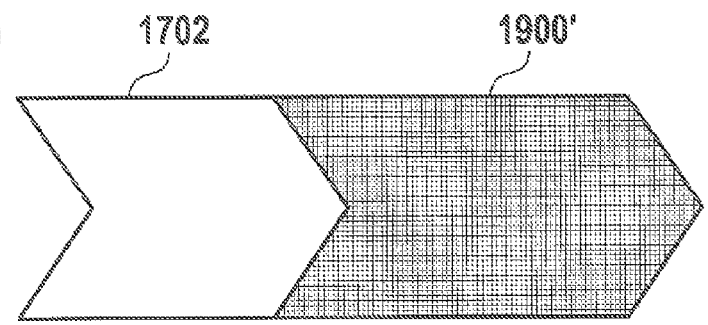

FIG. 20 shows the results of applying these rules. In this case the chevron A 1900 is perfectly aligned with chevron B 1702 and the extra space 1902 shown in FIG. 19 has disappeared. This means we switch the condition and action side of the rule. The rule is also symmetrical in the sense that the rules of chevron A 1900, 1700 and chevron B 1702 could be switched. That is it is not important which of the two is the existing shape and which is the inserted shape.

Figure 21:
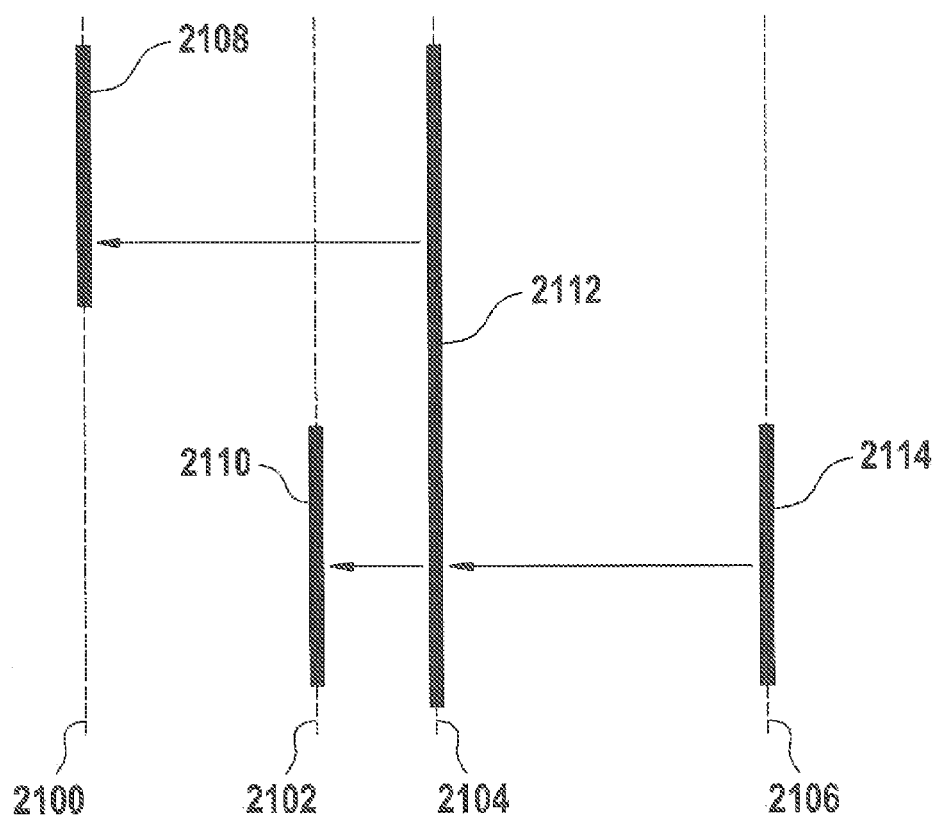
FIG. 21 illustrates the collision between gridlines.

FIG. 21 is used to illustrate the collision between gridlines. Shown is a gridline 1 2100, a second gridline 2102, a third gridline 2104, and a fourth gridline 2106. Gridline 1 2100 has a first span 2108, Gridline 2 2102 has a second span 2110. Gridline 3 2104 has a third span 2112. Gridline 4 2106 has a fourth span 2114. The following text details the collisions between the gridlines.

Figure 22:
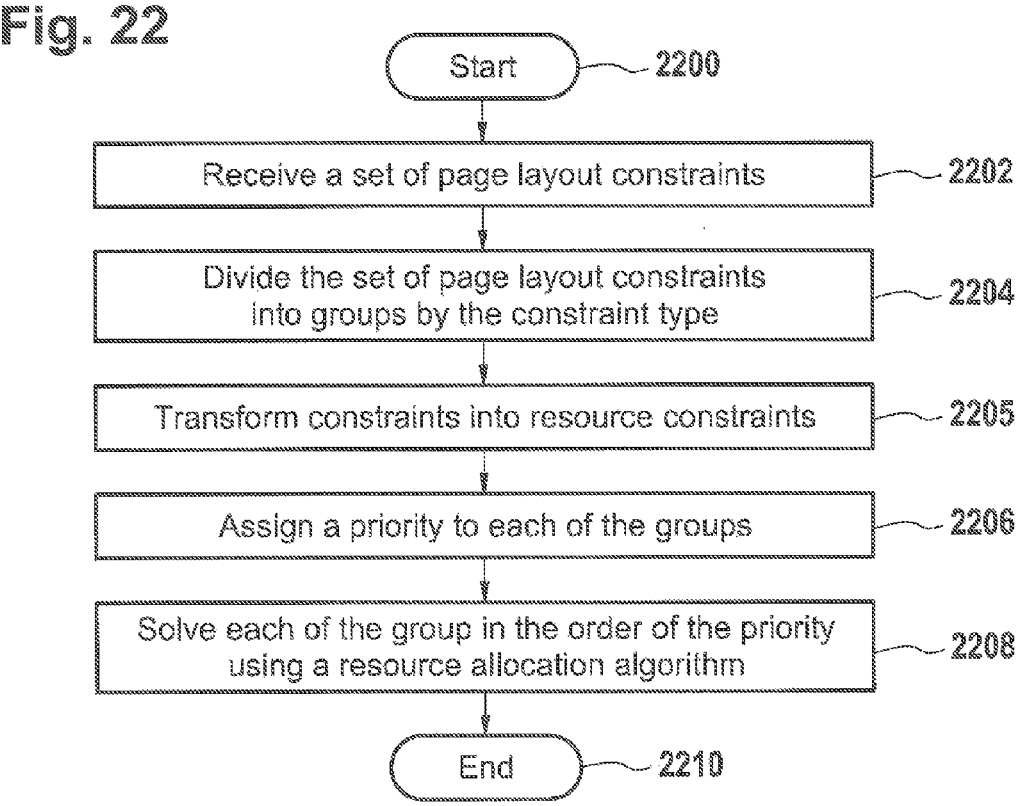
FIG. 22 shows a flow diagram which illustrates a method according to an embodiment of the invention.

FIG. 22 shows a flow diagram which illustrates a method according to an embodiment of the invention. In step 2200 the method starts. Next a set of page layout constraints are received in step 2202. The step of receiving a set of page layout constraints 2200 may include a method of entering page layout constraints such as those illustrated in FIG. 1 and FIG. 2. Next in step 2204 the set of page layout constraints is divided into groups according to the constraint type. Next in step 2205 the constraints in each of the groups are transformed into resource constraints. Next in step 2206 a priority is assigned to each group. Then in step 2208 each of the groups is solved in the order of the priority using a resource allocation algorithm. All of the constraints in a particular group are solved simultaneously. Next in step 2210 the method ends.

Figure 23:
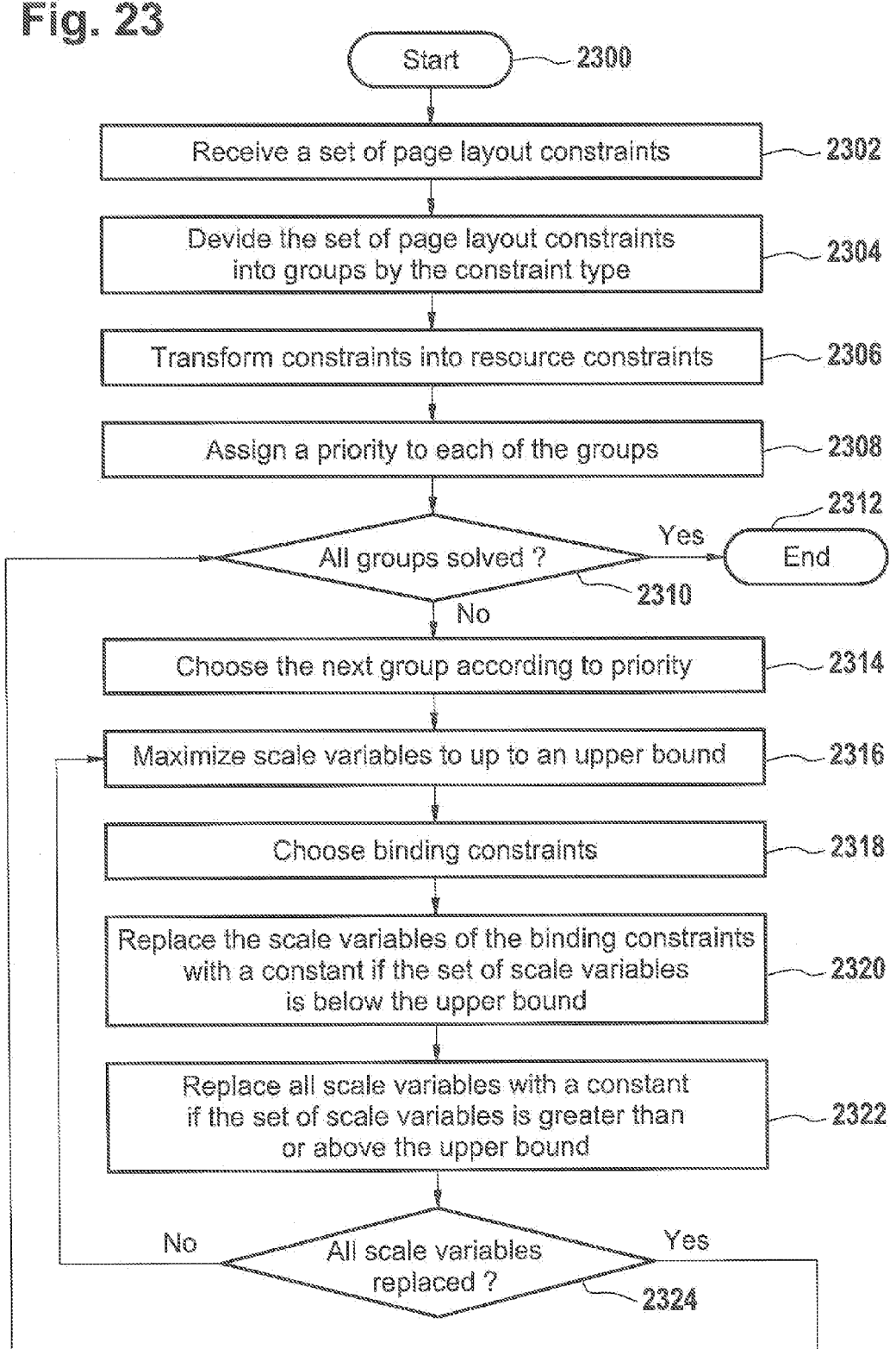
FIG. 23 shows a flow diagram which illustrates a method according to a further embodiment of the invention.

FIG. 23 shows a flow diagram which illustrates a method according to a further embodiment of the invention. The method starts with step 2300. Next in step 2302 a set of page layout constraints is received. As with step 2202 in FIG. 22 the set of page layout constraints may be received by performing a method of entering page layout constraints according to an embodiment of the invention. Next in step 2304 the set of page layout constraints are divided into groups according to the constraint type. In step 2306 the constraints in each of the groups are transformed into resource constraints. Then in step 2308 a priority is assigned to each of the groups. Step 2310 is a decision box which asks are all groups solved. And if the case is yes then the method ends in step 2312. If not the method proceeds to step 2314 where the next group according to priority is chosen. In step 2316 the scale variables of the group are maximized up to an upper bound. A scale value solution is calculated in this step. Next in step 2318 binding constraints are chosen from the group of page layout constraints. In step 2320 the scale variables of the biding constraints are replaced with the constant value of the scale value solution if the scale variables are below the upper bound. In step 2322 all of the scale variables of the group of page layout constraints are replaced with the scale value solution if the scale variables are equal to or above the upper bound. Step 2324 is another decision box. In this decision box the question is asked are all scale variables replaced with a constant. If the answer is no then the method returns to step 2316 to maximize the scale variables again. When all scale variables have been replaced then the method proceeds back to step 2310 to determine if all groups have been solved. If it is yes then of course the method ends in step 2312 and if not the next group according to priority is chosen 2314. The method repeats iteratively until all groups have been solved and with all of the scale variables being replaced.

Figure 24:
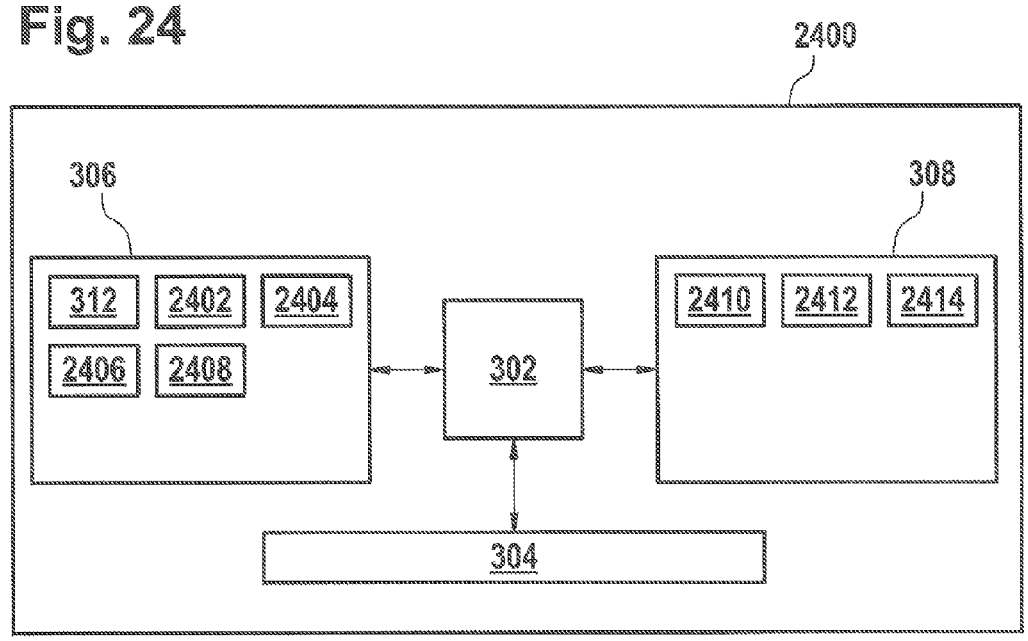
FIG. 24 illustrates a computer according to an embodiment of the invention.

FIG. 24 shows a computer system 2400 according to an embodiment of the invention. The embodiments shown in FIGS. 3 and 4 may be combined with the embodiment shown in FIG. 24. The computer system 2400 comprises a CPU 302 in connection with the user interface 304, computer storage 306, and computer memory 308. The computer storage 306 is shown as containing a set of page layout constraints 312. The computer storage 306 is further shown as containing a group of constraints 2402. The group of constraints 2402 was divided into groups from the set of constraints 312. The computer storage 306 is further shown as containing groups of constraints with resource constraints added 2404. The computer storage 306 is further shown as containing group priorities 2406. Each of the groups of constraints with resource constraints added 2404 has a priority within the group of priorities 2406 assigned to it. The computer storage 306 also shows a solved set of constraints 2408. The solved set of constraints 2408 is equivalent to a page layout on the canvas.

The computer memory 308 is shown as containing a resource constraint module 2410. The resource constraint module 2410 contains computer-executable code which is able to add the resource constraints to the group of constraints 2402 to create the group of constraints with resource constraints added 2404. The computer memory 308 is further shown as containing a priority module 2412. The priority module 2412 contains computer-executable code used for creating the group priorities 2406 which essentially assigns a priority to each of the groups of constraints 2404. The computer memory 308 is shown as further containing a resource allocation algorithm 2414. The resource allocation algorithm 2414 is able to solve the group of constraints with resource constraints added 2404 to create the solved set of constraints 2408. Software modules 2410, 2412, and 2414 may be equivalent to the constraint resolution algorithm module 326 of FIGS. 3 and 4.

Figure 25:
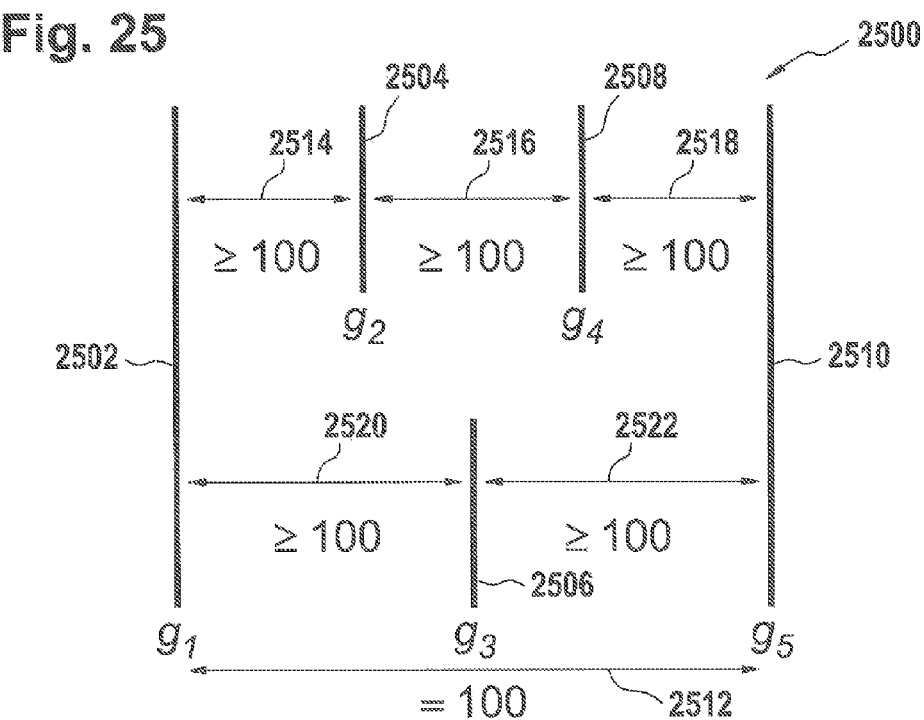
FIG. 25 through 27 illustrate the solution of an over-constrained system of constraints.
Figure 26:
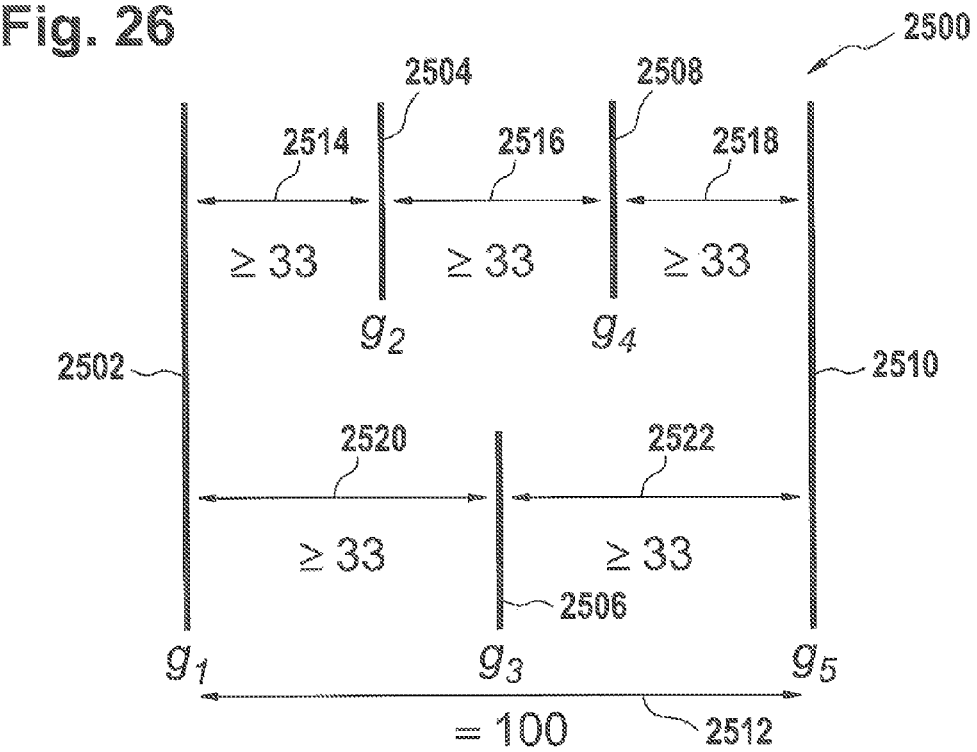
Figure 27:
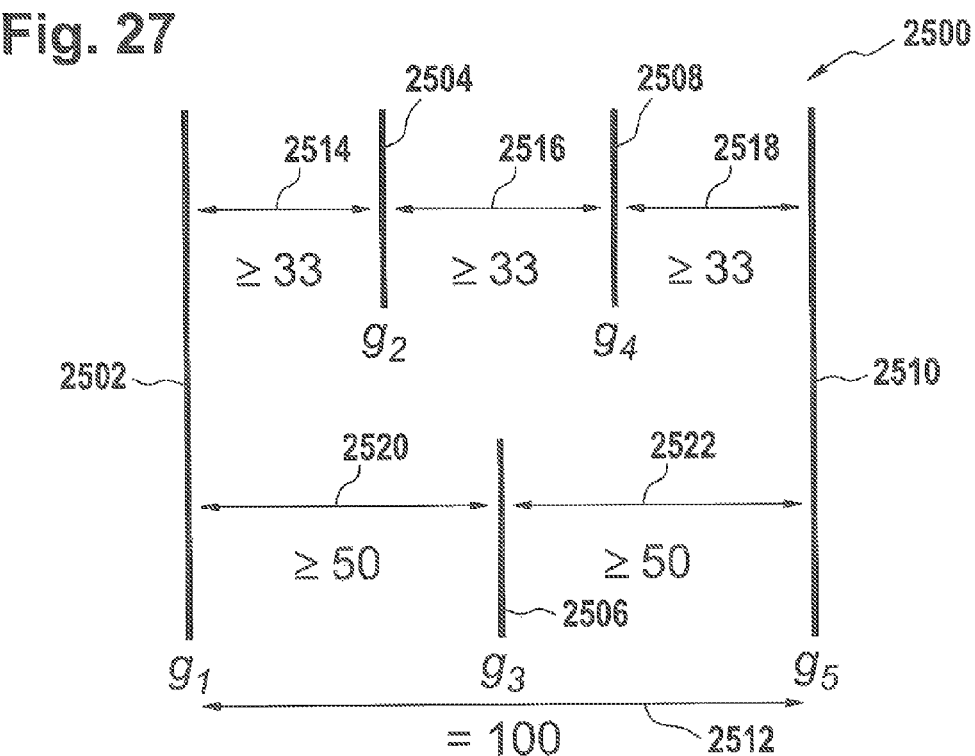

FIGS. 25, 26, and 27 illustrate the solution of an over-constrained system of constraints 2500. In this example, the minimum distance constraints. $C_{Min}$ is the set of all minimum distance constraints which are defined as a linear combination of real coefficients $c_i$ and gridline positions $g_L v$ that is larger than some distance d.

The over-constrained set of constraints is:

$$C_{Min} := \left\{ \sum_{i=1}^{n} c_i \cdot g_i \cdot v \geq d \;\middle|\; \neg g_i \cdot f, g_i \in \mathcal{G}_x \cup \mathcal{G}_y, c_i, d \in \mathbb{R} \right\}$$

We assume the constraints cannot be all satisfied. Into each constraint we introduce scale variable $s_k$. After the introduction of the scale variable, the transformed constraint set $C'_{Min}$ is always feasible. Each $s_k$ can be negative to satisfy any minimum distance constraint.

The constraints $c_i \cdot g_i v \geq d$ are transformed into the resource constraints $c_i \cdot g_i v \geq d \cdot s_k$. This transforms the set of constraints to:

$$C'_{Min} := \left\{ \sum_{i=1}^{n} c_i \cdot g_i \cdot v \geq d \cdot s_k \;\middle|\; \neg g_i \cdot f, g_i \in \mathcal{G}_x \cup \mathcal{G}_y, c_i, d, s_k \in \mathbb{R} \right\}$$

Since $d_k \geq 0$ $\forall e_k \in C'_{Min}$ and because there is always an $S_k$ (<0), the set $C'_{Min}$ in is fulfilled. When $s_k = 1$ $\forall k$ then all constraints in $C_{Min}$ are also fulfilled. The gap constraints are also considered:

$$C'_{Gap} := \{g_j \cdot v - g_i \cdot v \geq s_k\}$$

This example shows a small over-constrained constraint system in scaled form.

Five minimum distance constraints shown in red conflict with the hard constraint that limits the distance between $g_1$ and $g_5$ to value 100.

Not all minimum distance constraints can be satisfied. Thus, a decision has to be made which constraints to satisfy by how much.

There is no ordering over the constraints giving one constraint a higher priority than the others, they are all equal.

FIG. 25 shows the example of an over-constrained system of constraints 2500. In this Fig. there are five gridlines. These are labeled 2502, 2504, 2506, 2508, and 2510. They are also labeled $g_1$-$g_5$. There is a hard or fixed constraint of 100 units between gridline 2502 and 2510. The distance between 2502 and 2510 is 100. Constraint 2514 is a minimum distance of 100 between gridline 2502 and 2504. Minimum distance constraint 2516 is a minimum distance of 100 between gridlines 2504 and 2508. Constraint 2518 is a minimum constraint of 100 units between gridline 2508 and 2510. Constraint 2520 is a minimum distance constraint between gridline 2502 and 2506. Constraint 2522 is a minimum distance of 100 between gridline 2506 and 2510. As the distance between gridlines 2502 and 2510 is fixed at 100 the other constraints are not able to be satisfied, the system 2500 is therefore over-constrained. The five minimum distance constraints shown in red are in conflict with the hard constraint 2512 that limits the distance between 2502 and 2510 to 100. Obviously not all minimum distance constraints can be satisfied. Thus a decision has to be made which constraints to satisfy by how much. In this example there is no ordering over the constraints giving one constraint a higher priority than the others. All the constraints 2514, 2516, 2518, 2520 and 2522 are all equal.

The constraints are:

$$g_1 < g_2 < g_4 < g_5$$

$$g_1 < g_3 < g_5$$

$$g_5 - g_1 = 100$$

$$g_2 - g_1 \geq 100 \cdot s_1$$

$$g_4 - g_2 \geq 100 \cdot s_2$$

$$g_5 - g_4 \geq 100 \cdot s_3$$

$$g_3 - g_1 \geq 100 \cdot s_4$$

$$g_5 - g_3 \geq 100 \cdot s_5$$

FIG. 26 shows the first step in resolving the over-constrained system. First a scale variable is added to the minimum distance constraints. All scale variables are maximized equally. That is to say the constraint satisfaction is equally distributed between the five minimum distance constraints. This also means that the least satisfiable constraints in the upper row, these are constraints 2514, 2516 and 2518, are satisfied as much as possible. This results in each of the constraints 2514, 2516, 2518, 2520, 2522 being modified to being a minimum distance constraint that is 33 units or bigger. This results in the constraints 2514, 2516 and 2518 being satisfactorily solved. However the constraints 2520 and 2522 can be improved.

The scale variables after this step are:

$$\vec{s} = \begin{pmatrix} 1/3 \\ 1/3 \\ 1/3 \\ 1/3 \\ 1/3 \end{pmatrix}$$

Next in FIG. 27 the results of further maximizing the scale variables $s_4$ and $s_5$ is achieved to resolve the situation. The constraints 2520 and 2522 are modified such that they are equal to 50 units or larger. The solution shown in FIG. 27 is optimal in the sense that we cannot make any constraint better off without decreasing the global minimum.

The scale variables after this step are:

$$\vec{s} = \begin{pmatrix} 1/3 \\ 1/3 \\ 1/3 \\ 1/3 \\ 1/3 \end{pmatrix}$$

Figure 28:
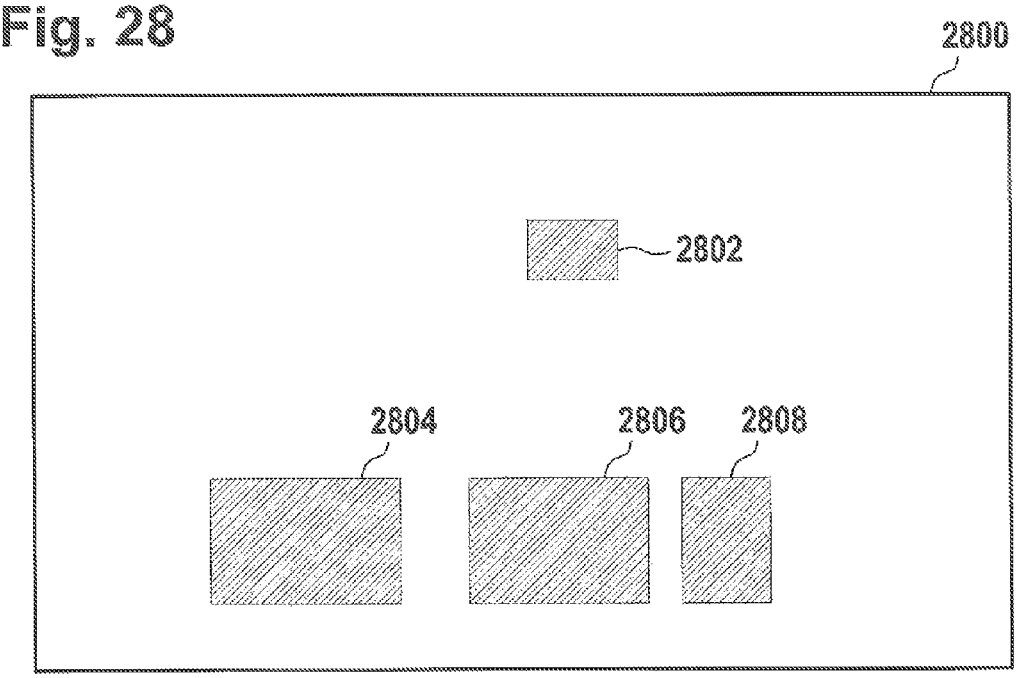
FIG. 28 shows a drawing of a container with graphical objects

FIG. 28 shows a drawing of a container 2800 with graphical objects 2802, 2804, 2806 and 2808 that have been placed into the container 2800 by a user.

Figure 29:
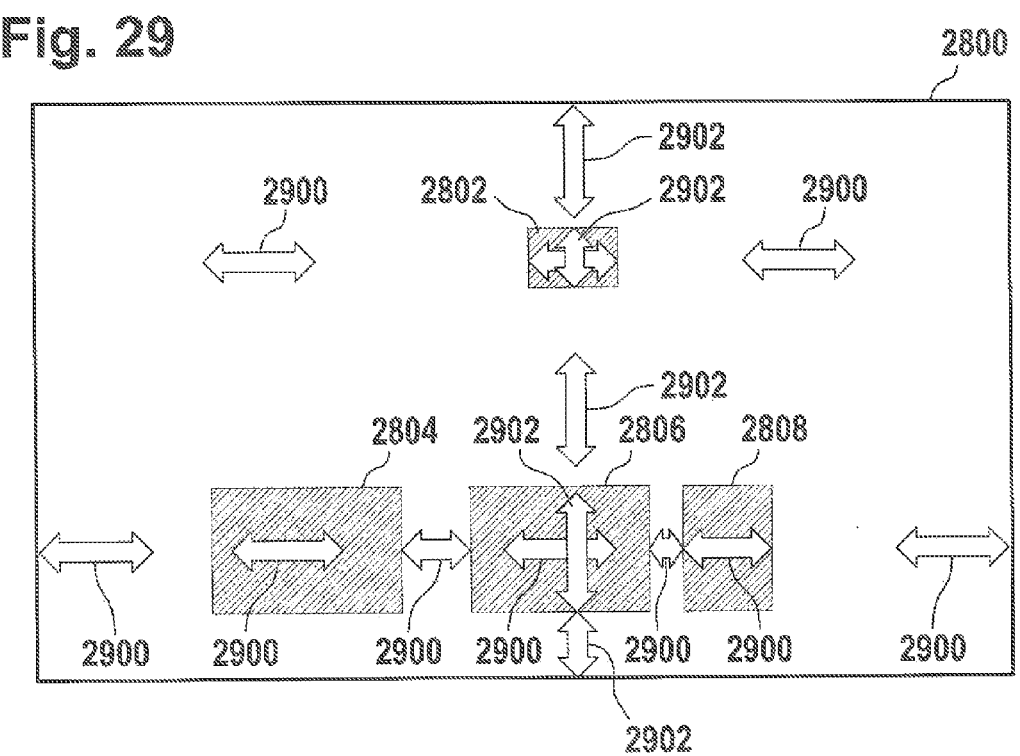
FIG. 29 shows FIG. 28 with gap constraints added.

FIG. 29 shows the same objects 2802, 2804, 2806, and 2808 along with all gap constraints. Shown are horizontal gap constraints 2900 and vertical gap constraints 2902. In the next step all gap constraints are made the same size and as large as possible. Both the horizontal constraints 2900 and the vertical constraints 2902 have been made the same size. The result of this is shown in FIG. 30.

Figure 30:
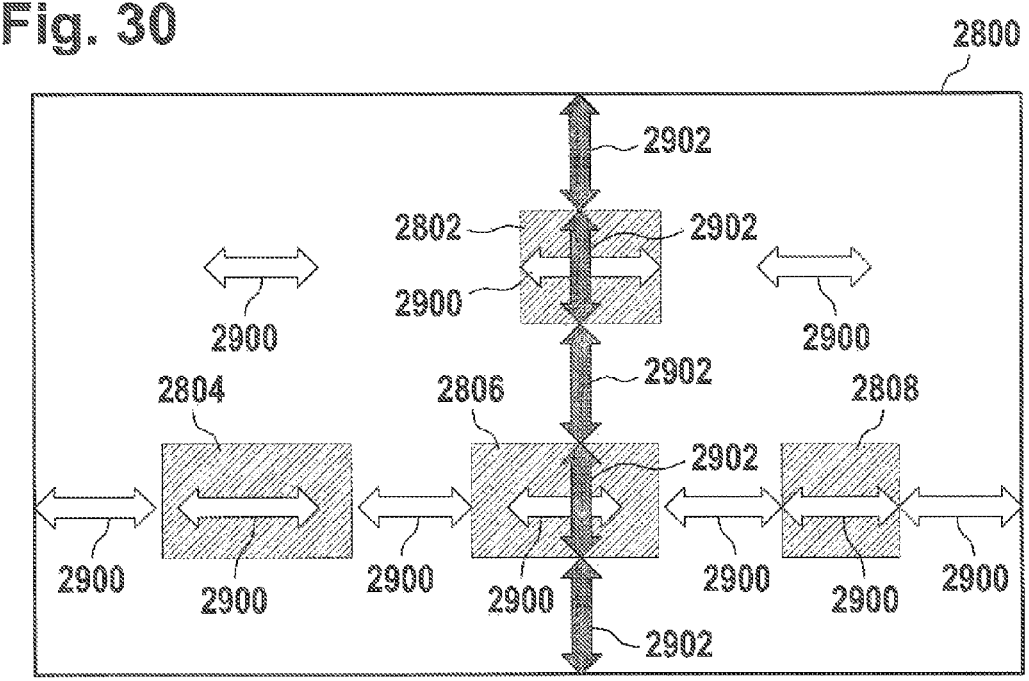
FIG. 30 through 32 illustrate the solution of the gap constraints shown in FIG. 29.
Figure 31:
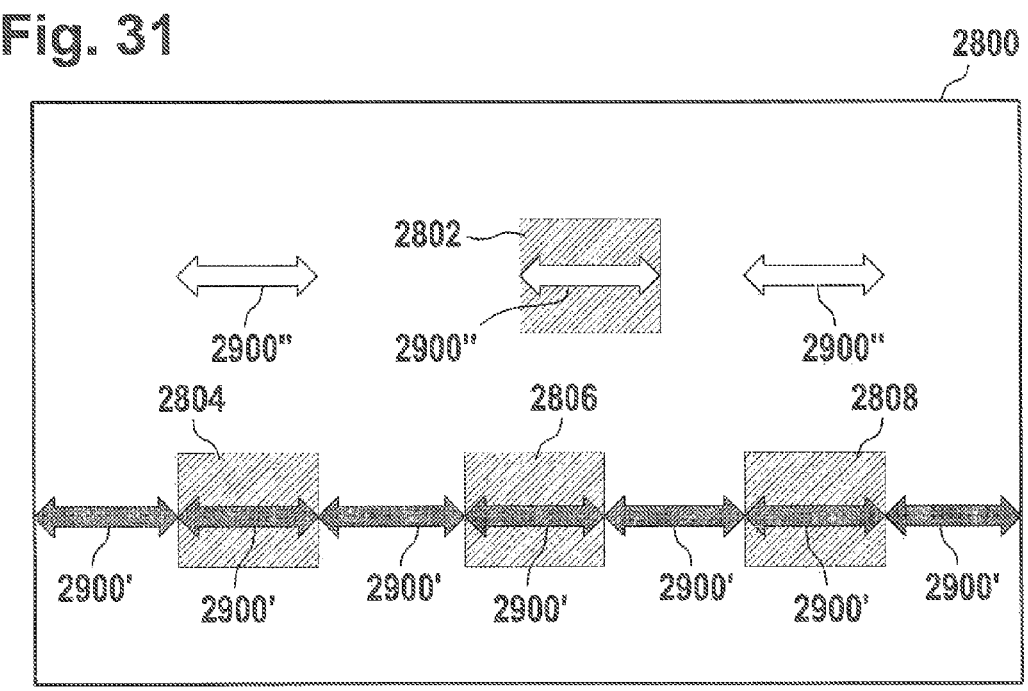
Figure 32:
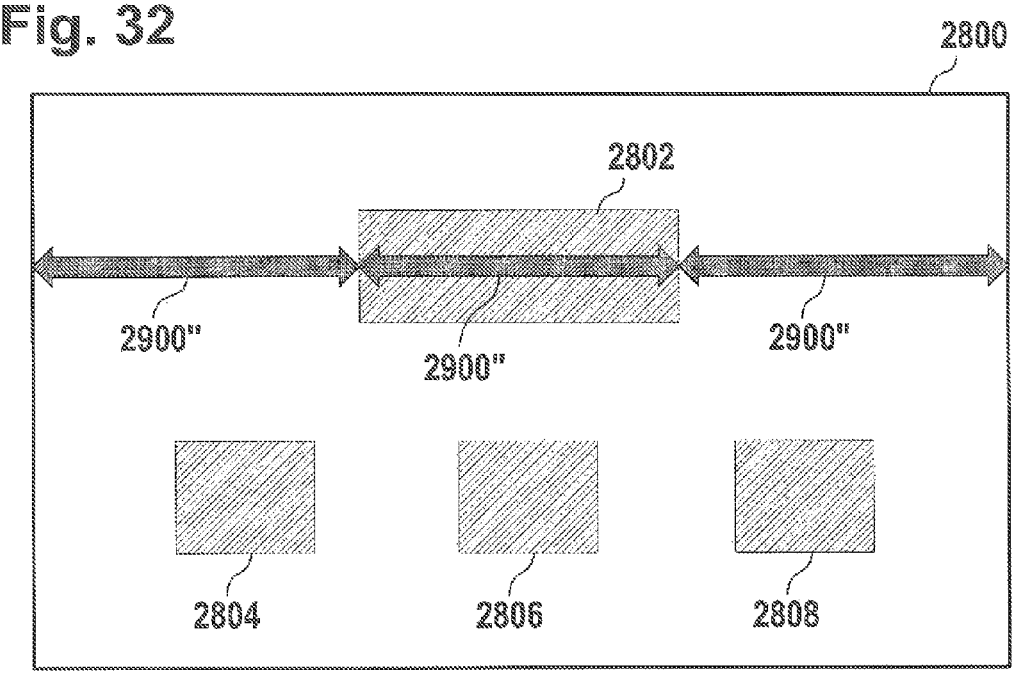
Figure 33:
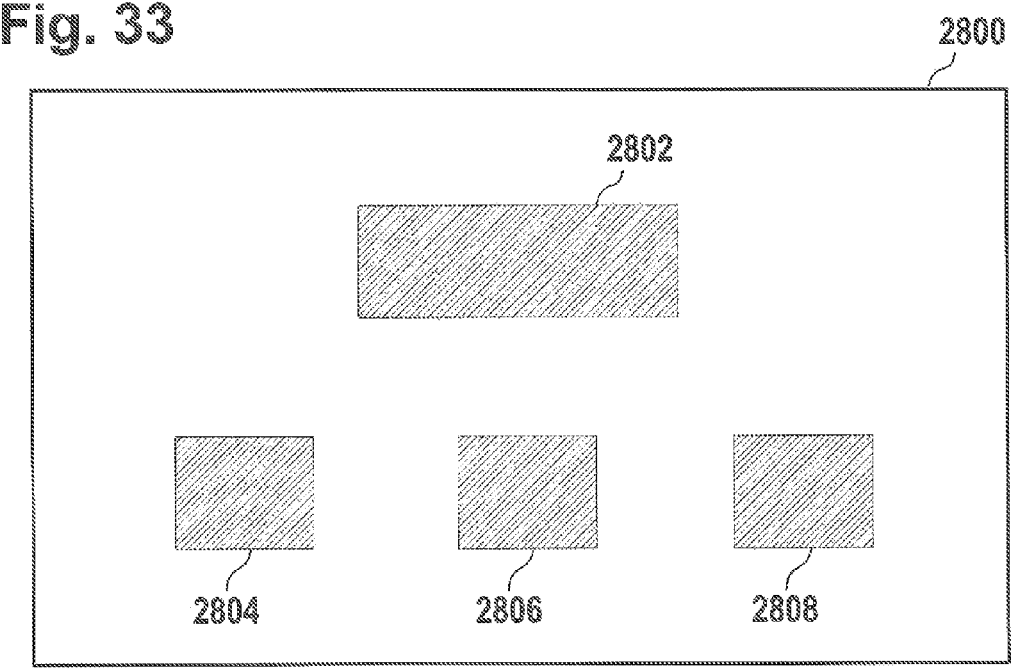
FIG. 33 shows the graphical objects of FIG. 28 after the constraint system has been solved.

In the example shown in FIG. 30 the vertical gaps 2902 cannot be made any larger. Their value is fixed at the achieved value and in the next Figs. we go into maximizing the remaining gaps. The gaps 2902 are set to a fixed size or replaced with a constant value. For the remainder of the algorithm the vertical gaps 2902 do not change any further. In FIG. 31 the horizontal gap constraints 2900' and 2900" are increased in size the same amount until they cannot be increased in size any larger. The horizontal constraints labeled 2900' have their value fixed and they are not modified any further. Next in FIG. 32 the horizontal gap constraints 2900" are increased in size as large as possible and are set equal to each other. This fully constrains and sets position of the graphical objects 2902, 2904, 2906, and 2908. Finally in FIG. 33 the final position of the graphical objects 2802, 2804, 2806 and 2808 are shown in the rendering of the container 2800 without the gap constraints. This shows the final positioning of the graphical objects 2802, 2804, 2806, 2808 using a method according to an embodiment of the invention.

Figure 34:
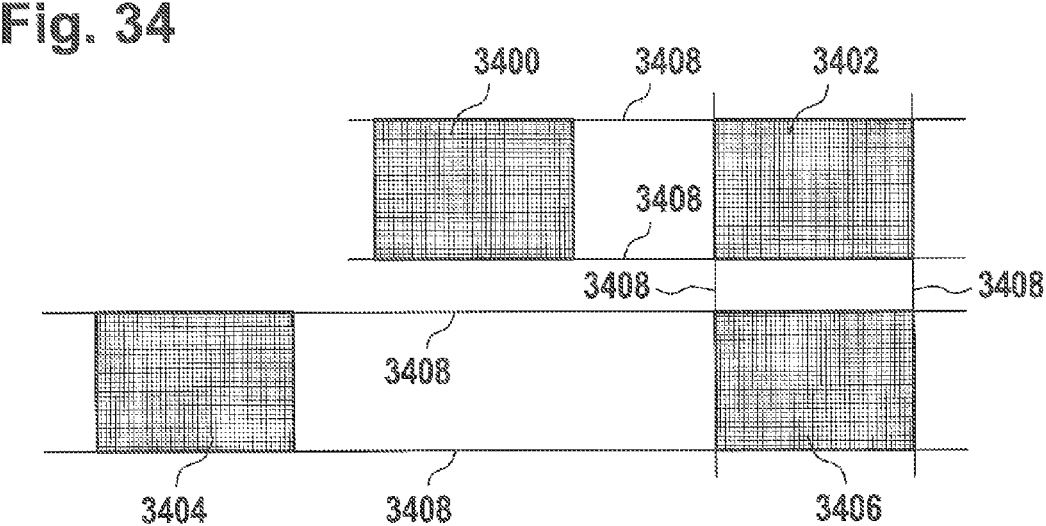
FIG. 34 illustrates one configuration of under constrained graphical objects.

FIG. 34 shows graphical objects 3400, 3402, 3404, and 3406. Graphical object 3400 is aligned with graphical object 3402. There are gridlines 3408 showing the alignment between these two graphical objects 3400, 3402. Graphical objects 3402 and 3406 are also aligned and there are gridlines 3408 which also show the alignment between graphical objects 3402 and 3406. Graphical objects 3404 and graphical object 3406 are also aligned and there are gridlines 3408 which show the alignment between graphical objects 3404 and 3406. Graphical objects 3400 and 3404 have not been aligned and are under-constrained. Graphical objects 3400 and 3404 are not constrained directly, but indirectly because they cannot collide due to alignments with other shapes.

Figure 35:
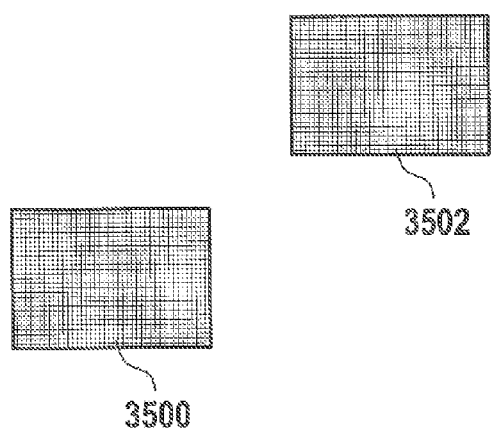
FIG. 35 illustrates another configuration of under constrained graphical objects.

FIG. 35 shows graphical objects 3500 and 3502. In this case the user has drawn two shapes 3500, 3502 diagonally to each other. No gap constraints are inserted because the shape spans do not collide with each other in either direction. In the example shown in FIG. 35 since there are no constraints the final layout would be to place both shapes 3500, 3502 on top of each other and just show a single rectangular shape. This problem can be avoided by looking at the pairs of gridlines assigned to the two shapes 3500, 3502. If the position of the gridlines are examined at the starting time and at the time when the two shapes are placed on top of each other the distance or motion from the original position to the final position can be determined. If at any time the gridlines are reordered or collided then we have found a situation where the graphical objects are under-constrained. Gridlines cannot be moved from their original position to their final position without colliding in between. This collision is not prevented however we can find the earliest such collision between any pair of gridlines that are moved and place gap constraints between them to eliminate this problem.

Figure 36:
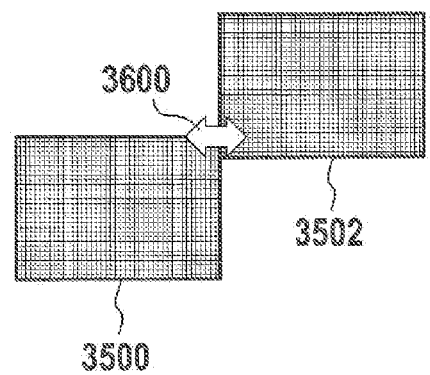
FIG. 36 and FIG. 37 illustrate the addition of an additional constraint to the graphical objects in FIG. 25.

In FIG. 36 the complete layout algorithm is repeated from its initial input. In this case the gap constraint 3600 is added between the graphical objects 3500 and 3502. This prevents the collision between the two graphical objects 3500, 3502.

Figure 37:
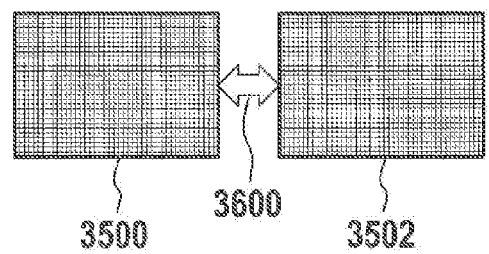

Finally in FIG. 37 the final position of the graphical objects 3500 and 3502 are shown with the gap constraint 3600. The FIGS. 35, 36, 37 have illustrated how a gap constraint 3600 can be added to an under-constrained system of graphical objects 3500, 3502.

Figure 38:
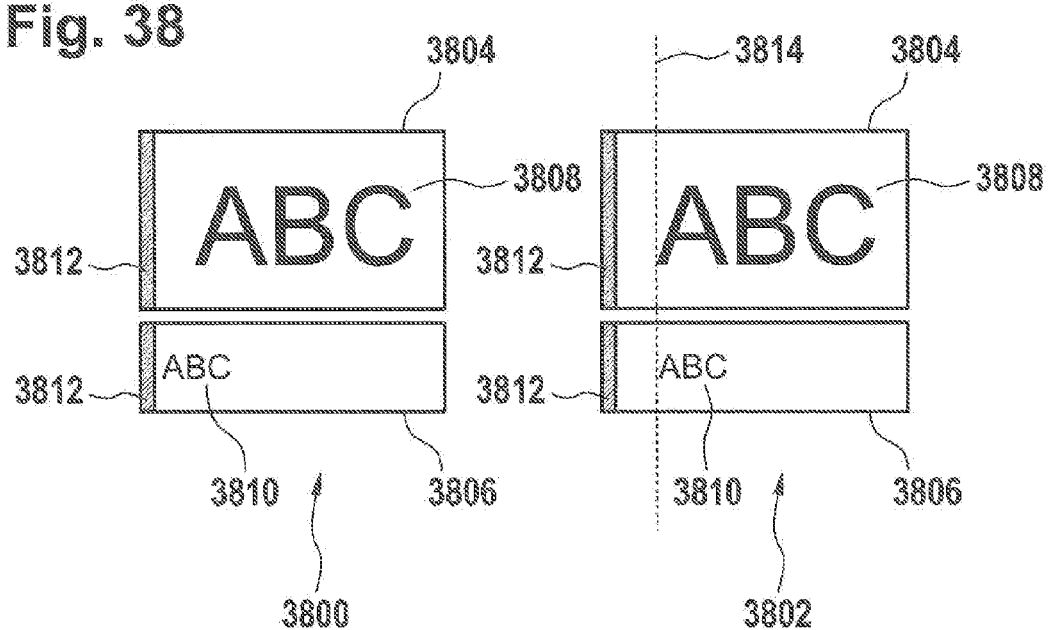
FIG. 38 illustrates a text alignment between two graphical objects.

FIG. 38 illustrates a text alignment 3814 between two graphical objects 3804, 3806. In FIG. 38, two views 3800 and 3802 are shown. In the first view 3800 a first graphical object 3804 and a second graphical object 3806 are shown. The first graphical object 3804 is a box containing a first text 3808. The second graphical object 3806 is a second box containing a second text 3810. The first text 3808 is center justified with respect to the first graphical object 3804. The second text 3810 is left justified with respect to the second graphical object 3806. The first graphical object and the second graphical object have an alignment constraint which causes the alignment of the spans marked 3812. Each of the spans 3812 is a left edge of the first graphical object 3804 or the second graphical object 3806 and has been emphasized in the figure.

The second view 3802 shown in FIG. 38 is identical to the first view 3800 except that a text alignment 3814 has been added. The first text 3808 and the second text 3810 are both aligned to the text alignment 3814.

The doctoral dissertation "Sketching Slides—interactive creation and automatic solution of constrained document layout problems" by Sebastian Christoph Theophil, submitted to the Mathematisch-Naturwissenschaftliche Fakultät II (Faculty of Mathematical Natural Sciences II) of the Hurnumbodt-Universität zu Berlin (Humboldt University in Berlin, Germany), and published on Jul. 27, 2011, is hereby incorporated by reference in its entirety. This dissertation is cataloged and available from the library of the Humboldt-Universität zu Berlin in Berlin, Germany. It may be possible to obtain an electronic copy online by searching for the Uniform Resource Name: urn:nbn:de:kobv:11-100192419.

LIST OF REFERENCE NUMERALS

| | |
|---|---|
| 300 | computer |
| 302 | processor |
| 304 | user interface |
| 306 | computer storage |
| 308 | computer memory |
| 310 | container |
| 312 | page layout constraints |
| 314 | graphical objects |
| 316 | page layout |
| 320 | page layout program |
| 322 | gridline collision module |
| 324 | page layout insertion module |
| 326 | constraint resolution algorithm module |
| 328 | graphical user interface module |
| 330 | graphical user interface |
| 332 | canvas |
| 334 | set of graphical objects |
| 400 | box graphical object |
| 402 | text |
| 404 | insertion graphical object |
| 406 | highlighted spans |
| 500 | graphical object |
| 502 | first vertical gridline |
| 504 | second vertical gridline |
| 506 | third vertical gridline |
| 508 | first horizontal gridline |
| 510 | second horizontal gridline |
| 512 | third horizontal gridline |
| 514 | vertical low gridline |
| 516 | vertical interior gridline |
| 518 | vertical high gridline |
| 520 | horizontal low gridline |
| 522 | horizontal interior gridline |
| 524 | horizontal high gridline |
| 526 | first horizontal direction |
| 528 | second horizontal direction |
| 530 | first vertical direction |
| 532 | second vertical direction |
| 600 | box graphical object |
| 602 | low y box gridline |
| 604 | high y box gridline |
| 606 | low x box gridline |
| 608 | high x box gridline |
| 700 | pentagon graphical object |
| 702 | low y box gridline/pentagon vertical low gridline |
| 704 | high y box gridline/pentagon vertical high gridline |
| 706 | low x box gridline/high pentagon back |

-continued

| | |
|---|---|
| 708 | high x box gridline/high pentagon arrow head base |
| 710 | high pentagon tip |
| 800 | existing graphical object |
| 802 | inserted graphical object |
| 804 | mouse cursor |
| 806 | highlighted spans |
| 902 | inserted graphical object |
| 1000 | first column |
| 1002 | second column |
| 1002' | second column |
| 1200 | cursor position |
| 1300 | insertion object |
| 1302 | highlighted span |
| 1304 | visible gridline |
| 1500 | pentagon graphical object |
| 1502 | low pentagon vert gridline |
| 1504 | high pentagon vert gridline |
| 1506 | low pentagon back |
| 1508 | low pentagon arrow head base |
| 1510 | low pentagon tip |
| 1600 | chevron graphical object |
| 1602 | low chevron/low pseudo chevron |
| 1700 | chevron A |
| 1700' | chevron A |
| 1702 | chevron B |
| 1704 | gap |
| 1900 | chevron A |
| 1900' | chevron A |
| 1902 | space |
| 2100 | gridline 1 |
| 2102 | gridline 2 |
| 2104 | gridline 3 |
| 2106 | gridline 4 |
| 2108 | span 1 |
| 2110 | span 2 |
| 2112 | span 3 |
| 2114 | span 4 |
| 2400 | computer |
| 2402 | groups of constraints |
| 2404 | groups of constraints with resource constraints added |
| 2406 | group priorities |
| 2408 | solved set of constraints |
| 2410 | resource constraint module |
| 2412 | priority module |
| 2414 | resource allocation algorithm |
| 2500 | system of constraints |
| 2502 | gridline g1 |
| 2504 | gridline g2 |
| 2506 | gridline g3 |
| 2508 | gridline g4 |
| 2510 | gridline g5 |
| 2512 | hard constraint |
| 2514 | distance constraint |
| 2516 | distance constraint |
| 2518 | distance constraint |
| 2520 | distance constraint |
| 2522 | distance constraint |
| 2524 | distance constraint |
| 2800 | container |
| 2802 | graphical object |
| 2804 | graphical object |
| 2806 | graphical object |
| 2808 | graphical object |
| 2900 | horizontal gap constraint |
| 2902 | vertical gap constraint |
| 3400 | graphical object |
| 3402 | graphical object |
| 3404 | graphical object |
| 3406 | graphical object |
| 3408 | gridlines |
| 3500 | graphical object |
| 3502 | graphical object |
| 3600 | gap constraint |
| 3800 | first view |
| 3802 | second view |
| 3804 | first graphical object |
| 3806 | second graphical object |
| 3808 | first text |
| 3810 | second text |
| 3812 | aligned spans |
| 3814 | text alignment |

What is claimed is:

1. A method of entering page layout constraints into a computer, the method comprising the steps of:
providing a container for representing a page layout, wherein the container is delimited by an existing set of gridlines;
providing a set of graphical objects, each of the graphical objects having a set of object gridlines for delimiting important graphical features of the object, wherein each of the set of object gridlines has a span which is identical with one of: where the object and the gridline overlap and where the object and the gridline intersect;
selecting the set of graphical objects one by one;
placing each selected graphical object within the container, wherein each of the selected graphical objects are positioned by one of: snapping the position of the span to a non-empty gridline and positioning the span onto the container by adding a new gridline;
determining at least one pair of colliding gridlines, wherein colliding gridlines have a parallel direction and at least one pair of spans which at least partially overlap in the parallel direction;
inserting page layout constraints between the at least one pair of colliding gridlines;
storing in a hierarchical data structure the gridlines within the container and the page layout constraints between the gridlines; and
applying a constraint resolution for automatic layout of the graphical objects to the stored hierarchical data structure and for automatically repositioning and resizing graphical object based on the constraints between the spans.

2. The method of claim 1, wherein the method further comprises the step of applying a constraint resolution algorithm for automatically repositioning and re-sizing the graphical objects using the page layout constraints.

3. The method of claim 2, wherein the method further comprises displaying the container with the graphical object after repositioning and resizing the graphical objects within the container.

4. The method of claim 1, wherein at least one of the set of graphical objects comprises predefined constraints between the set of object gridlines, and wherein the predefined constraints are added to the page layout constraints.

5. The method of claim 1, wherein the method further comprises repositioning a graphical object within the container by performing the steps of:
selecting a reposition object from the set of graphical objects located within the container for repositioning;
filtering gridlines belonging only to the reposition object located within the container, wherein filtering gridlines makes them unavailable for a snapping operation;
placing the reposition object within the container, wherein the reposition object is positioned by one of: snapping the position of the span to a non-empty gridline and positioning the span onto the container by adding a new gridline;
inserting page layout constraints between the pairs of gridlines.

6. The method of claim 1, wherein the method further comprises the steps of:
- highlighting the span when snapping the span to the non-empty gridline;
- highlighting at least one other span, wherein the at least one other span is aligned with the non-empty gridline.

7. The method of claim 1, wherein each span is classified as one of: a high span, an interior span, or a low span; wherein the span is classified a high span if the object is to a first direction with respect to the span; wherein the span is classified as interior if the span is at least partially within the object; wherein a span is classified as a low span if the object is to a second direction with respect to the span; wherein the method further comprises the step of displaying a snapping span during a snapping operation; wherein the snapping span is highlighted in the first direction if the span is the high span; wherein the snapping span is highlighted in both the first direction and the second direction if the snapping span is an interior span; and wherein the snapping span is highlighted in the second direction if the span is a low span.

8. The method of claim 1, wherein the method further comprises the steps of:
- detecting an overlap of two or more graphical objects;
- moving the two or more graphical objects to remove the overlap by moving spans of the two or more graphical objects apart.

9. The method of claim 1, wherein there is a first existing object and a second existing object and each is chosen from the set of graphical objects located in the container, wherein there is at least one page layout constraint between the first existing object and the second existing object, wherein the method further comprises inserting an insertion graphical object between the first existing object and the second existing object by performing the steps of:
- placing the insertion graphical object between the first existing object and the second existing object;
- determining a set of non-overlapping positions, wherein each member of the set of non-overlapping positions defines a non-overlapping position for the first existing object, the second existing object, and the insertion graphical object;
- selecting one of the set of non-overlapping positions; and
- repositioning gridlines of the first existing object, the second existing object, and the insertion graphical object in accordance with the one of the set of non-overlapping positions; and
- inserting page layout constraints between the repositioned gridlines.

10. The method of claim 9, wherein the one of the set of non-overlapping positions is selected by finding a maximum cardinality set of overlapping objects that can be moved to a new position without overlapping each other.

11. The method of claim 1, wherein the container contains a deletion object, wherein the deletion object is a graphical object associated with container gridlines and comprises spans, wherein the deletion object is located between a first existing object and a second existing object, wherein the method further comprises deleting the deletion object by performing the steps of:
- determining if there are any existing page layout constraints between the first existing object and the second existing object;
- removing the deletion object and any page layout constraints between the first existing object and deletion object and any page layout constraints between the second existing object and the deletion object; and
- colliding the first existing object and the second existing object if there is no remaining page layout constraint between the first existing object and the second existing object, wherein colliding the first existing object and the second existing object causes at least one span from each of the first existing object and the second existing object to snap to the same gridline.

12. The method of claim 1, wherein the method further comprises the step of adding a content element to each of the set of graphical objects, wherein the content element comprises any one of the following: a video clip, text, an image, a diagram, a figure, a three-dimensional model rendering, and combinations thereof.

13. The method of claim 1, wherein the method further comprises the steps of:
- adding a new page layout constraint;
- removing an existing page layout constraint if the new page constraint violates the existing page constraint.

14. The method of claim 1, wherein the page layout constraints may be any one of the following: a minimum distance constraint, a maximum distance constraint, a fixed distance constraint, an equal distance constraint, and a merge constraint.

15. The method of claim 1, wherein the container contains an existing graphical object, wherein the method further comprises copying and pasting the existing graphical object by performing the steps of:
- selecting the existing graphical object located within the container for repositioning;
- creating a copy graphical object from the existing graphical object;
- placing the copy graphical object within the container, wherein the copy graphical object is positioned by one of: snapping the position of the span to a non-empty gridline and positioning the span onto the container by adding a new gridline;
- inserting page layout constraints between the pairs of gridlines.

16. The method of claim 1, wherein the method further comprises the steps of:
- selecting a subset of existing page layout constraints, wherein the page layout constraints are selected by any one of the following methods: selecting all of the existing page layout constraints, selecting layout constraints of a preselected type, and selecting page layout constraints between gridlines belonging to one or more selected shapes, and combinations thereof;
- displaying the subset of existing page layout constraints graphically on a display when placing each of the set of graphical objects in the container, and
- generating new page layout constraints after the selected page layout constraints have been manipulated or deleted.

17. The method of claim 1, wherein the method of claim 1 is applied to a multiple page document, wherein the multiple page document comprises multiple pages each represented by one of a set of multiple containers, which has the same position on all pages in the multi page document thereby aligning the graphical object on each of the pages, wherein the method further comprises the steps of:
- selecting a gridline from a first page of the multiple page document;
- inserting a copy of the gridline into the second page of the multiple page document, wherein the gridline and the copy of the gridline are logically linked to form a global gridline, and wherein the global gridline has the same position in both the first page and the second page.

18. The method of claim 1, wherein the snapping of the position of the span to the non-empty grid line is performed by:
applying sequentially a set of snapping rules to determine the snapping of the span to the non-empty gridline; and
undoing the snapping of the span to the non-empty gridline if two or more of the set of snapping rules violate each other.

19. A non-transitory computer readable storage medium storing machine readable instructions, wherein execution of the instructions cause a processor to:
provide a container for representing a page layout, wherein the container is delimited by an existing set of gridlines;
provide a set of graphical objects, each of the objects having a set of object gridlines for delimiting important graphical features of the object, wherein each of the set of object gridlines has a span which is identical with one of: where the object and the gridline overlap and where the object and the gridline intersect;
receive the selection of the set of graphical objects one by one;
receive the placement of each selected graphical object within the container, wherein each of the selected graphical objects are positioned by one of: snapping the position of the span to a non-empty gridline and positioning the span onto the container by adding a new gridline;
determine at last one pair of colliding gridlines, wherein colliding gridlines have a parallel direction and at least one pair of spans which at least partially overlap in the parallel direction;
insert page layout constraints between the at least one pair of colliding gridlines;
store in a hierarchical data structure the gridlines within the container and the page layout constraints between the gridlines; and
apply a constraint resolution for automatic layout of the graphical objects to the stored hierarchical data structure and for automatically repositioning and re-sizing graphical object based on the constraints between the spans.

20. A computer system comprising a processor and a non-transition computer readable storage medium storing machine readable instructions, wherein execution of the instructions cause a processor to:
provide a container for representing a page layout, wherein the container is delimited by an existing set of gridlines;
provide a set of graphical objects, each of the objects having a set of object gridlines for delimiting important graphical features of the object, wherein each of the set of object gridlines has a span which is identical with one of: where the object and the gridline overlap and where the object and the gridline intersect;
receive the selection of the set of graphical objects one by one;
receive the placement of each selected graphical object within the container, wherein each of the selected graphical objects are positioned by one of: snapping the position of the span to a non-empty gridline and positioning the span onto the container by adding a new gridline;
determine at least one pair of colliding gridlines, wherein colliding gridlines have a parallel direction and at least one pair of spans which at least partially overlap in the parallel direction;
insert page layout constraints between the at least one pair of colliding gridlines;
store in a hierarchical data structure the gridlines within the container and the page layout constraints between the gridlines; and
apply a constraint resolution for automatic layout of the graphical objects to the stored hierarchical data structure and for automatically repositioning and re-sizing graphical object based on the constraints between the spans.

* * * * *